United States Patent
Ogihara et al.

(10) Patent No.: US 8,972,777 B2
(45) Date of Patent: Mar. 3, 2015

(54) METHOD AND SYSTEM FOR STORAGE MANAGEMENT

(71) Applicant: Fujitsu Limited, Kawasaki-shi (JP)

(72) Inventors: Kazutaka Ogihara, Hachioji (JP); Yasuo Noguchi, Kawasaki (JP); Tatsuo Kumano, Kawasaki (JP); Masahisa Tamura, Kawasaki (JP); Kazuichi Oe, Yokohama (JP); Toshihiro Ozawa, Yokohama (JP); Munenori Maeda, Yokohama (JP); Ken Iizawa, Yokohama (JP); Jun Kato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 187 days.

(21) Appl. No.: 13/845,217

(22) Filed: Mar. 18, 2013

(65) Prior Publication Data

US 2013/0262924 A1  Oct. 3, 2013

(30) Foreign Application Priority Data

Mar. 30, 2012 (JP) ................................. 2012-082253

(51) Int. Cl.
| | |
|---|---|
| *G06F 11/00* | (2006.01) |
| *G06F 11/14* | (2006.01) |
| *G06F 11/10* | (2006.01) |
| *G06F 11/20* | (2006.01) |

(52) U.S. Cl.
CPC ........ *G06F 11/1412* (2013.01); *G06F 11/1088* (2013.01); *G06F 11/2089* (2013.01)
USPC ........................................ 714/6.2; 714/6.21

(58) Field of Classification Search
CPC .................................... G06F 11/1088
USPC .......................... 714/6.2, 6.21, 6.22, 6.3, 6.32
See application file for complete search history.

(56) References Cited

U.S. PATENT DOCUMENTS

| | | | | |
|---|---|---|---|---|
| 7,574,554 | B2 * | 8/2009 | Tanaka et al. | 711/103 |
| 8,060,688 | B2 * | 11/2011 | Mergler et al. | 711/103 |
| 2008/0022163 | A1 * | 1/2008 | Tanaka et al. | 714/710 |
| 2009/0157959 | A1 * | 6/2009 | Miyazaki | 711/114 |
| 2014/0136903 | A1 * | 5/2014 | Hyde et al. | 714/47.3 |

FOREIGN PATENT DOCUMENTS

| | | |
|---|---|---|
| JP | 2005-055995 | 3/2005 |
| JP | 2005-099995 | 4/2005 |
| JP | 2007-042001 | 2/2007 |

\* cited by examiner

*Primary Examiner* — Dieu-Minh Le
(74) *Attorney, Agent, or Firm* — Fujitsu Patent Center

(57) ABSTRACT

Multiple storage apparatuses are provided, at least part of which are individually incorporated into one of storage groups. Each of multiple control apparatuses is configured to, when assigned one or more of the storage groups each including one or more of the storage apparatuses, control data storage by storing data designating each assigned storage group redundantly in the storage apparatuses of the assigned storage group. An information processing apparatus is configured to, when a storage group with data redundancy being lost is detected, make a change in control apparatus assignment for the storage groups in such a manner that a storage group different from the detected storage group is not assigned to a control apparatus with the detected storage group assigned thereto. Subsequently, the information processing apparatus causes the control apparatus to execute a process of restoring the data redundancy of the detected storage group.

8 Claims, 26 Drawing Sheets

127e RAID GROUP MANAGEMENT TABLE

118f CPU MANAGEMENT TABLE

| CPU-ID | STATUS | ATTRIBUTE | CONNECTED DISK LIST |
|---|---|---|---|
| CPU-01 | ASSIGNED | ... | DISK-A, DISK-B, DISK-C, DISK-D |
| CPU-02 | ASSIGNED | ... | DISK-E, DISK-F |
| CPU-03 | UNASSIGNED | ... | NONE |
| CPU-04 | FAILED | ... | NONE |

FIG. 12

118g  DISK MANAGEMENT TABLE

| DISK-ID | STATUS | ATTRIBUTE | CONNECTED CPU-ID |
|---|---|---|---|
| DISK-A | ASSIGNED | ... | CPU-01 |
| DISK-B | ASSIGNED | ... | CPU-01 |
| DISK-C | ASSIGNED | ... | CPU-01 |
| DISK-D | ASSIGNED | ... | CPU-01 |
| DISK-E | ASSIGNED | ... | CPU-02 |
| DISK-F | ASSIGNED | ... | CPU-02 |
| DISK-G | UNASSIGNED | ... | NONE |
| DISK-H | FAILED | ... | NONE |

FIG. 13

118h  RAID GROUP MANAGEMENT TABLE

| RAID-ID | LEVEL | STATUS | ATTRIBUTE | CONNECTION-TARGET CPU | DISK LIST |
|---|---|---|---|---|---|
| RAID-a | RAID5 | NORMAL | ... | CPU-01 | DISK-A, DISK-B, DISK-C, DISK-D |
| RAID-b | RAID1 | DEGRADED | ... | CPU-02 | DISK-E, DISK-F |

FIG. 14

METHOD AND SYSTEM FOR STORAGE MANAGEMENT

CROSS-REFERENCE TO RELATED APPLICATION

This application is based upon and claims the benefit of priority of the prior Japanese Patent Application No. 2012-082253, filed on Mar. 30, 2012, the entire contents of which are incorporated herein by reference.

FIELD

The embodiments discussed herein are related to a method and system for storage management.

BACKGROUND

RAID (Redundant Array of Independent Disks) is one representative technology to improve reliability of data managed by a computer system. RAID allows the user to manage a combination of multiple hard disks as one redundant logical volume. There are multiple levels of RAID which differ in the data placement schemes and the data redundancy methods. For example, RAID 1, or mirroring, is the technique of writing the same data to more than one disk, and RAID 5 generates parity data from data stored on multiple disks and reconstructs lost data using the parity data.

Even if data management is done by storing data in a redundant manner (i.e., the same data is stored in more than one location), data redundancy may be lost due to a disk failure or the like. In such a case, the lost redundancy is restored using remaining data. The process of restoring data redundancy is referred to as a "rebuild process". One proposed technology for the rebuild process is directed to a disk sharing method for a flexible magnetic disk device using a hot spare disk. According to this method, in the event an on-line magnetic disk device in a logical volume fails, a rebuild function is implemented to restore data on the failed magnetic disk device using data on the remaining magnetic disk devices in the same logical volume.
Japanese Laid-open Patent Publication No. 2005-099995

A RAID controller is capable of controlling multiple RAID groups. In the event a disk belonging to one of the controlled RAID groups fails, a rebuild process is executed for the RAID group. However, executing a rebuild process for one of the multiple RAID groups under the control of the RAID controller increases the load of the RAID controller, which adversely affects other controlled RAID groups of the RAID controller. For example, accesses to normally operating RAID groups needing no rebuild process are inhibited, causing access delays. Such problems occur not only in RAID groups but also in an entire system that implements data management by storing data redundantly and executes a process of restoring data redundancy after being lost.

SUMMARY

According to one aspect, there is provided a storage management system including multiple storage apparatuses, multiple control apparatuses, and an information processing apparatus. At least part of the storage apparatuses are individually incorporated into one of storage groups in such a manner that each of the storage groups is made up of one or more of the storage apparatuses. Each of the control apparatuses is configured to, when assigned one or more of the storage groups, control data storage by storing data designating each of the assigned storage groups redundantly in the storage apparatuses of the assigned storage group. The information processing apparatus is configured to, when a storage group with data redundancy being lost is detected, make a change in control apparatus assignment for the storage groups in such a manner that a storage group different from the detected storage group is not assigned to a control apparatus with the detected storage group assigned thereto, and subsequently cause the control apparatus to execute a process of restoring the data redundancy of the detected storage group.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 12 illustrates an example of a CPU management table held by the RAID system managing unit;

FIG. 13 illustrates an example of a disk management table held by the RAID system managing unit;

FIG. 14 illustrates an example of a RAID group management table held by the RAID system managing unit;

DESCRIPTION OF EMBODIMENTS

Figure 1:
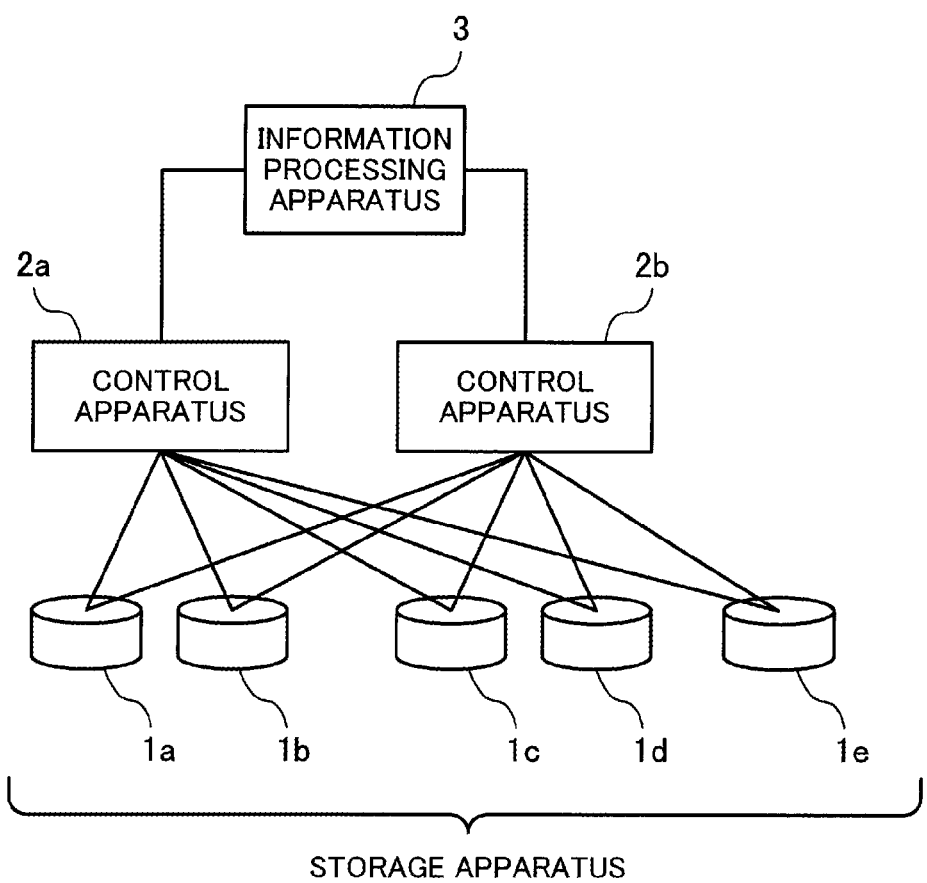
FIG. 1 illustrates an example of a functional configuration of a system according to a first embodiment.

Several embodiments will be described below with reference to the accompanying drawings, wherein like reference numerals refer to like elements throughout. Note that two or more of the embodiments below may be combined for implementation in such a way that no contradiction arises.

(a) First Embodiment

FIG. 1 illustrates an example of a functional configuration of a system according to a first embodiment. The system of the first embodiment includes multiple storage apparatuses 1a, 1b, 1c, 1d, and 1e; multiple control apparatuses 2a and 2b; and an information processing apparatus 3. The storage apparatuses 1a to 1e store data therein.

When assigned one or more groups (storage apparatus groups) each made up of one or more of the storage apparatuses 1a to 1e, each of the control apparatuses 2a and 2b controls data storage by storing data designating each of the assigned groups redundantly in the storage apparatuses of the assigned group. The control apparatuses 2a and 2b individually establish a communication path with each of the storage apparatuses 1a to 1e. Note that each of these communication paths may provide a permanent connection, or may be established via a switching device when a communication is initiated. Zero or more groups may be assigned to each of the control apparatuses 2a and 2b. That is to say, the individual control apparatuses 2a and 2b may be assigned multiple groups, or may be assigned no group.

In the case where RAID is employed to achieve data redundancy, the control apparatuses 2a and 2b are regarded as RAID controllers. Here, the term "RAID controller" is applied not only to a logic circuit of the RAID controller but also to a computer for achieving functions equivalent to those of the RAID controller.

When a group with data redundancy being lost is detected, the information processing apparatus 3 makes a change in current control apparatus assignment for the groups in such a manner that groups other than the detected group are not assigned to a control apparatus with the detected storage group assigned thereto. After such a change is made, the information processing apparatus 3 causes the control apparatus with the detected group assigned thereto to execute a process of restoring the data redundancy of the detected group.

In this manner, the information processing apparatus 3 undertaking the management function is provided separately from the control apparatuses 2a and 2b. The information processing apparatus 3 is capable of changing assignment of the storage apparatuses 1a to 1e to the control apparatuses 2a and 2b.

According to the above-described system, in the event a group has lost data redundancy, current control apparatus assignment for the groups is changed and a rebuild process is subsequently initiated according to instructions of the information processing apparatus 3.

Figure 2:
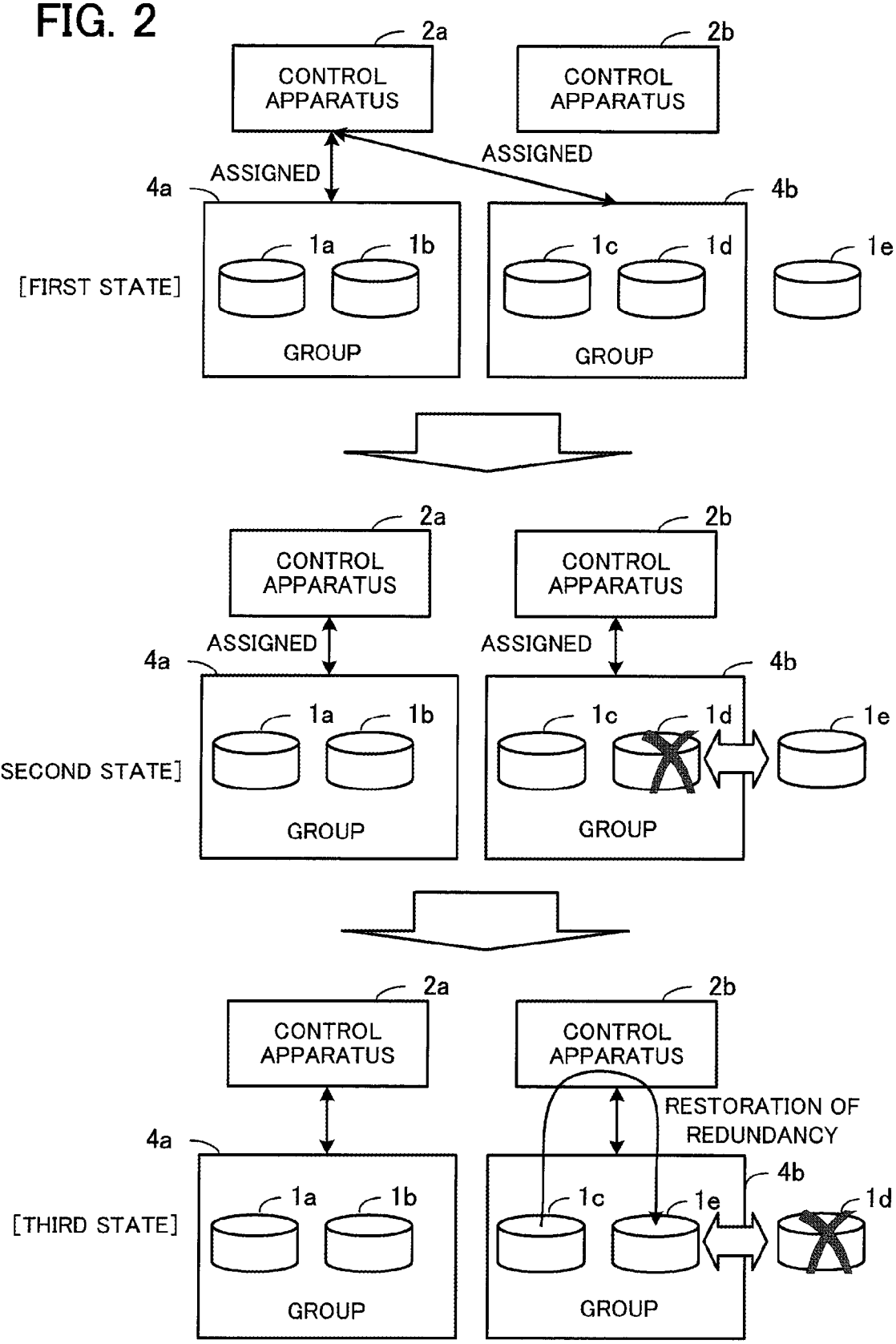
FIG. 2 illustrates an example of change in control apparatus assignment and a rebuild process according to the first embodiment.

FIG. 2 illustrates an example of change in control apparatus assignment and a rebuild process according to the first embodiment. The first state of FIG. 2 represents a normal operation condition. In the example of FIG. 2, two groups are provided, a group 4a including the storage apparatuses 1a and 1b and a group 4b including the storage apparatuses 1c and 1d. The two groups 4a and 4b both have been assigned to the control apparatus 2a in the first state. Therefore, data to be held in the individual groups 4a and 4b is stored by the control apparatus 2a in a redundant fashion.

The second state of FIG. 2 represents a condition where data redundancy has been lost. In the example of FIG. 2, data redundancy of the group 4b has been lost due to a failure of the storage apparatus 1d. In this case, the information processing apparatus 3 reassigns the group 4b to the control apparatus 2b. In addition, the failed storage apparatus 1d is removed from the group 4b, and the storage apparatus 1e is then added thereto as a replacement.

The third state of FIG. 2 represents a condition where a redundancy restoring process (i.e. rebuild process) is in progress. In the example of FIG. 2, the control apparatus 2b reads data from the storage apparatus 1c and then writes the read data in the storage apparatus 1e. In this manner, data is copied from the storage apparatus 1c to the storage apparatus 1e, to thereby restore data redundancy.

Note that the process illustrated in FIG. 2 may be restated in the following way. In the first state, the control apparatus 2a controls data storage of first data in such a manner that the first data is stored redundantly using the individual storage apparatuses 1a and 1b included in the group 4a (a first storage apparatus group). In addition, the control apparatus 2a controls data storage of second data in such a manner that the second data is stored redundantly using the individual storage apparatuses 1c and 1d included in the group 4b (a second storage apparatus group). In the second state, the information processing apparatus 3 detects that the redundant storage of the second data in the second storage apparatus group has been lost. Subsequently, the information processing apparatus 3 executes a process of placing a different control apparatus (2b) in charge of managing the individual storage apparatuses 1c and 1e of the second storage apparatus group. In the third state, the information processing apparatus 3 controls the control apparatus 2b to execute a process of reconstructing the redundant storage of the second data.

According to the first embodiment as described above, in the event data redundancy is lost in a group, the group with failed redundancy is reassigned to the control apparatus 2b having no assigned groups, and the control apparatus 2b executes the rebuild process. At this point, because the group 4a has been assigned to the control apparatus 2a, data access to the normally operating group 4a is not inhibited even if the rebuild process is executed. That is, the process of restoring the redundancy of the group 4b is prevented from adversely affecting the normally operating group 4a.

Note that the information processing apparatus of FIG. 1 may be implemented as hardware including a central processing unit (CPU), a random access memory (RAM), a hard disk drive (HDD) and the like. In FIG. 1, lines connecting the individual components represent only part of communication paths, and communication paths other than those illustrated are also configurable.

(b) Second Embodiment

Next described is a second embodiment that uses RAID as data reliability assurance technology. According to the second embodiment, CPUs selected from among multiple CPUs (a CPU pool) installed in a server are individually made to function as RAID controllers. In addition, RAID groups are formed by combining several HDDs selected from among multiple HDDs (a storage drive pool) installed in the server.

Figure 3:
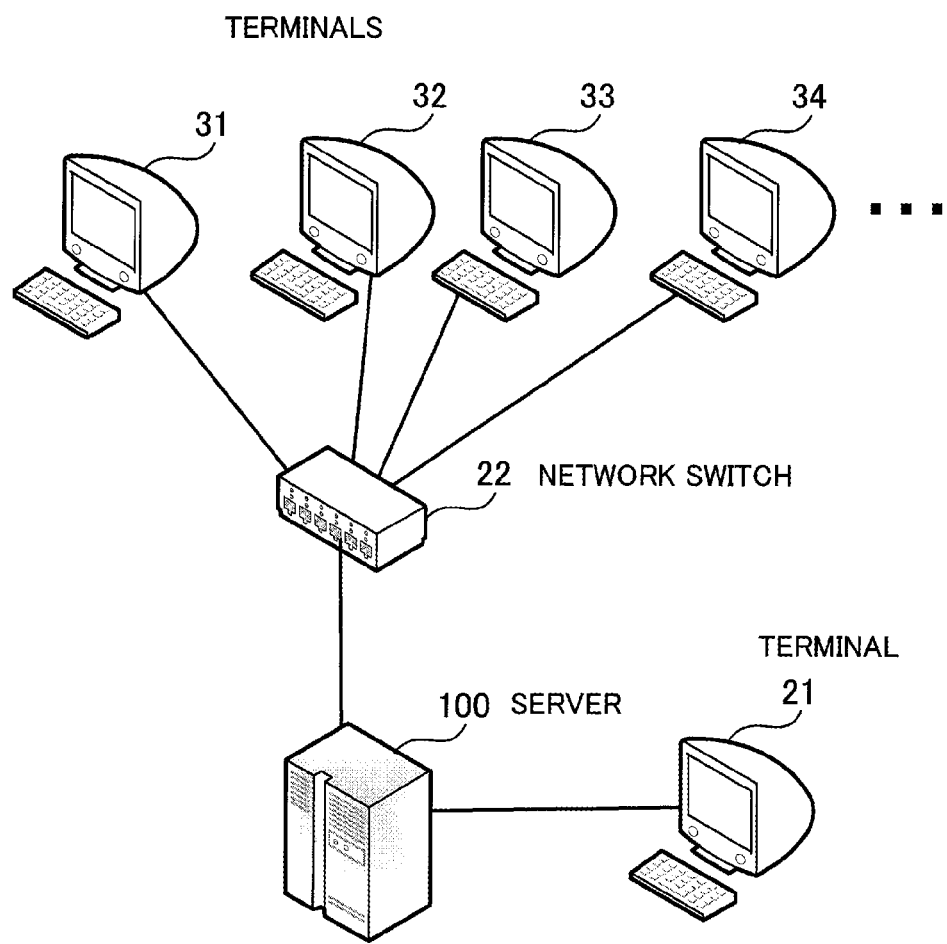
FIG. 3 illustrates an example of a system configuration according to a second embodiment.

FIG. 3 illustrates an example of a system configuration according to the second embodiment. A server 100 has multiple CPUs and multiple HDDs built-in. To the server 100, an administrative terminal 21 is connected. In addition, multiple terminals 31, 32, 33, 34, and . . . provided for the use of users are connected to the server 100 via a network switch 22.

Figure 4:
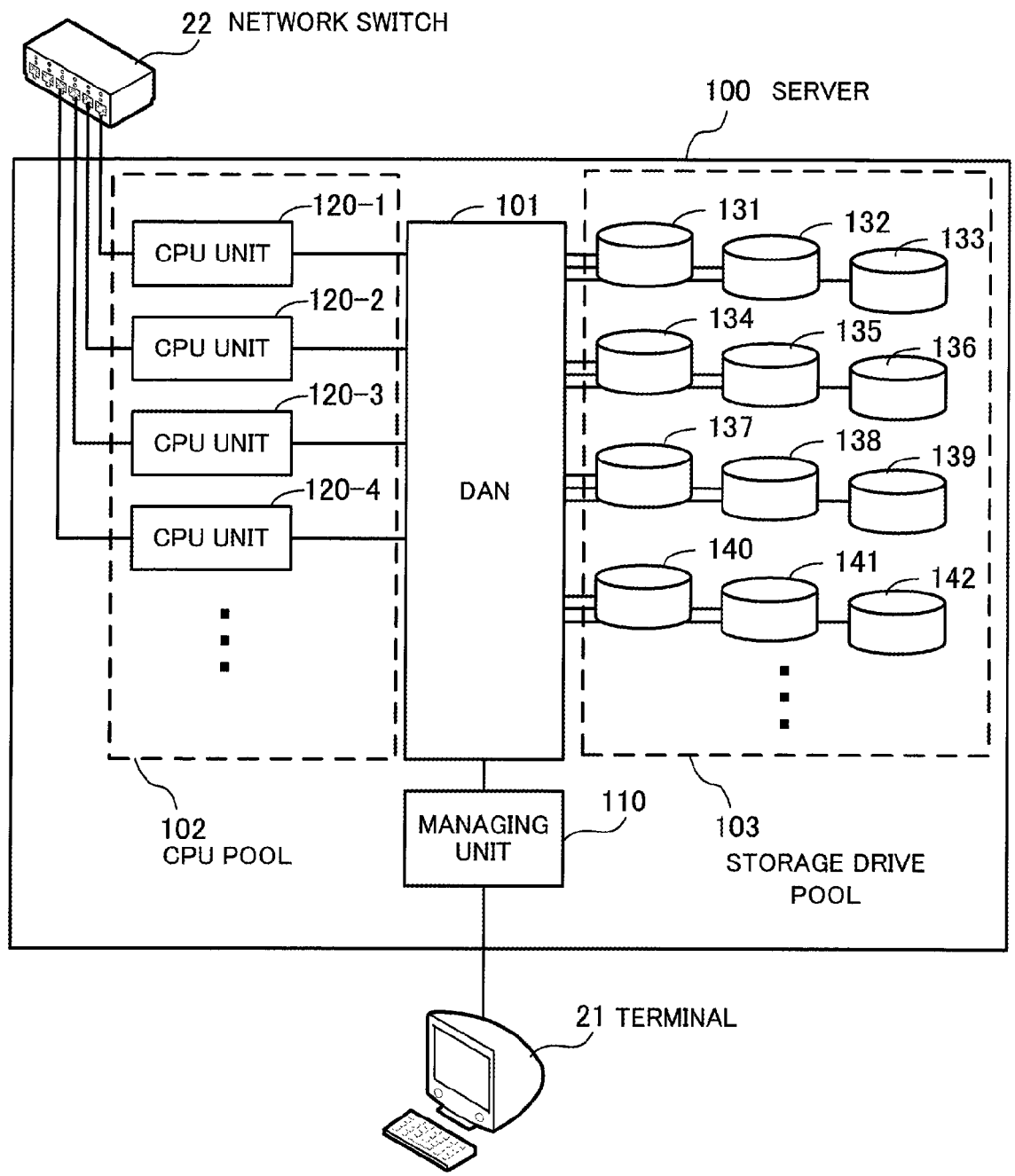
FIG. 4 illustrates an example of a hardware configuration of a server.

FIG. 4 illustrates an example of a hardware configuration of a server. In the server 100, multiple CPU units 120-1, 120-2, 120-3, 120-4, and . . . and multiple HDDs 131 to 142, and . . . are installed. The multiple CPU units 120-1, 120-2, 120-3, 120-4, and . . . belong to a CPU pool 102. The multiple HDDs 131 to 142, and . . . belong to a storage drive pool 103.

The CPU units 120-1, 120-2, 120-3, 120-4, and . . . are connected to the network switch 22. In addition, the CPU units 120-1, 120-2, 120-3, 120-4, and . . . are connected to the multiple HDDs 131 to 142, and . . . via a disk area network (DAN) 101. The DAN 101 interconnects the CPU units 120-1, 120-2, 120-3, 120-4, and . . . and the HDDs 131 to 142, and . . . .

To the DAN 101, a managing unit 110 is connected, which manages connection and disconnection between the CPU units and the HDDs on the DAN 101. The managing unit 110 also manages functions to be implemented by the CPU units. For example, the managing unit 110 selects, from among the multiple CPU units 120-1, 120-2, 120-3, 120-4, and . . . , a CPU unit to serve as a RAID controller, and subsequently, gives instructions to the selected CPU unit to operate as a RAID controller. To the managing unit 110, a terminal 21 is connected, and the managing unit 110 receives instructions from an administrator via the terminal 21.

Figure 5:
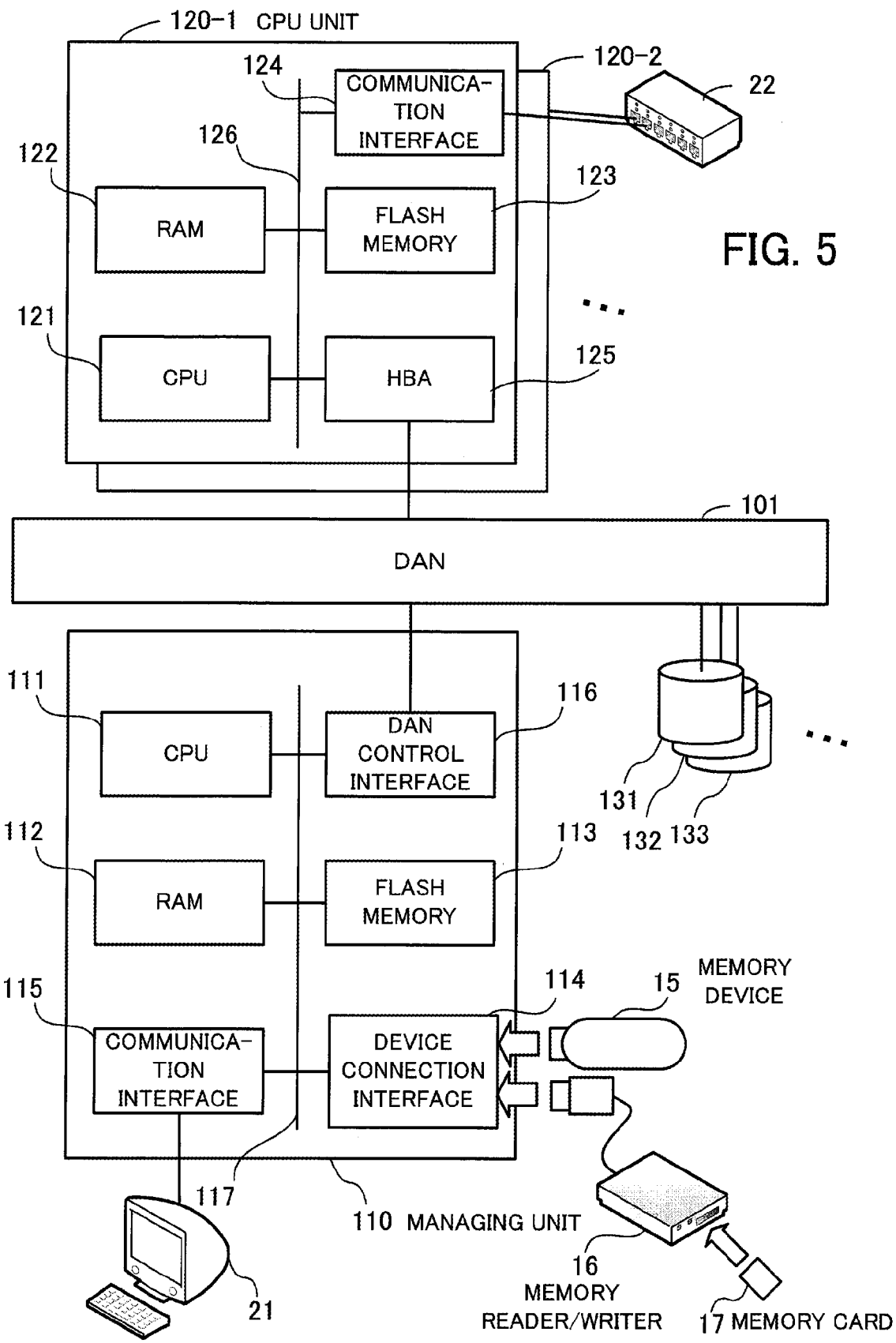
FIG. 5 illustrates an example of internal structures of a managing unit and a CPU unit.

FIG. 5 illustrates an example of internal structures of a managing unit and a CPU unit. Overall control of the managing unit 110 is exercised by a CPU 111. To the CPU 111, a RAM 112 and multiple peripherals are connected via a bus 117. Note that the number of CPUs in the managing unit 110 is not limited to one, and multiple CPUs may be provided instead. In that case, the multiple CPUs exercise overall control of the managing unit 110 in cooperation with one another.

The RAM 112 is used as a main storage device of the managing unit 110. The RAM 112 temporarily stores at least part of an operating system (OS) program and application programs to be executed by the CPU 111. The RAM 112 also stores various types of data needed by the CPU 111 for its processing.

The peripherals connected to the bus 117 include a flash memory 113, a device connection interface 114, a communication interface 115, and a DAN control interface 116. The flash memory 113 is a non-volatile semiconductor storage device and is used as an auxiliary storage device of the managing unit 110. The flash memory 113 stores an operating system program, application programs, and various types of data. Note that a magnetic storage device such as a HDD may be used as an auxiliary storage device in place of the flash memory 113. Alternatively, instead of providing the flash memory 113 serving as an auxiliary storage device inside the managing unit 110, one of the HDDs connected via the DAN 101 may be used as an auxiliary storage device of the managing unit 110.

The device connection interface 114 is used to connect peripherals to the managing unit 110. To the device connection interface 114, a memory device 15 and a memory reader/writer 16 may be connected. The memory device 15 is a recording medium having a function of communicating with the device connection interface 114. The memory reader/writer 16 is used to write and read data to and from a memory card 17. The memory card 17 is a card-type recording medium.

The communication interface 115 communicates with the terminal 21, transmitting data input from the terminal 21 to the CPU 111 and transmitting data sent from the CPU 111 to the terminal 21. The DAN control interface 116 is used to instruct a switching operation of a switch circuit in the DAN 101 and communicate with the CPU units.

Overall control of the CPU unit 120-1 is exercised by a CPU 121. To the CPU 121, a RAM 122 and multiple peripherals are connected via a bus 126. Note that the number of CPUs in the CPU unit 120-1 is not limited to one, and multiple CPUs may be provided instead. In that case, the multiple CPUs exercise overall control of the CPU unit 120-1 in cooperation with one another.

The RAM 122 is used as a main storage device of the CPU unit 120-1. The RAM 122 temporarily stores at least part of an operating system (OS) program and application programs to be executed by the CPU 121. The RAM 122 also stores various types of data needed by the CPU 121 for its processing.

The peripherals connected to the bus 126 include a flash memory 123, a communication interface 124, and a host bus adapter (HBA) 125. The flash memory 123 is a non-volatile semiconductor storage device and is used as an auxiliary storage device of the CPU unit 120-1. The flash memory 123 stores an operating system program, application programs, and various types of data. Note that a magnetic storage device such as a HDD may be used as an auxiliary storage device in place of the flash memory 123. Alternatively, instead of providing the flash memory 123 serving as an auxiliary storage device inside the CPU unit 120-1, one of the HDDs connected via the DAN 101 may be used as an auxiliary storage device of the CPU unit 120-1. The communication interface 124 communicates with the terminals 31, 32, 33, 34, and . . . via the network switch 22. The HBA 125 accesses the HDDs 131, 132, 133, and . . . via the DAN 101. For example, the HBA 125 writes and reads data to and from the HDDs 131, 132, 133, and . . . according to instructions of the CPU 121.

The hardware configuration described above achieves the processing functions of the second embodiment. Note that FIG. 5 illustrates the internal hardware configuration of the CPU unit 120-1 only, however, each of the remaining CPU units 120-2, 120-3, 120-4, and . . . may have the same hardware configuration. In addition, the information processing apparatus 3 of the first embodiment may have the same hardware configuration as the managing unit 110 of FIG. 5.

The managing unit 110 executes a program stored in a computer-readable storage medium, to thereby achieve the processing functions of the second embodiment. The program including processing contents to be executed by the managing unit 110 may be stored in various storage media. In the case where the program is stored in the flash memory 113, for example, the CPU 111 loads at least part of the stored program into the RAM 112 and then executes the program. In addition, the program may be stored in the memory device 15, the memory card 17, or other types of portable storage media such as optical disks. Examples of the optical disks are a digital versatile disk (DVD), a digital versatile disk random access memory (DVD-RAM), a compact disc read-only memory (CD-ROM), a CD recordable (CD-R), and a CD rewritable (CD-RW). The program stored in such a portable storage medium becomes executable, for example, after being installed into the flash memory 113 under the control of the CPU 111. In addition, the CPU 111 may execute the program by reading it directly from the portable storage medium. Note that transitory propagating signals are not considered here as storage media for storing the program.

In the case of distributing the program, for example, portable storage media with the program stored therein are sold. In addition, the program may be stored in a storage device of a different server computer and then transferred from the server computer to the managing unit 110 via a network. In the case of acquiring the program via a network, the managing unit 110 stores the acquired program, for example, in the flash memory 113, and then the CPU 111 of the managing unit 110 executes the program in the flash memory 113. Further, the managing unit 110 may sequentially receive parts of the program transferred from the server computer and execute a process according to each partial program upon receiving it.

The hardware configuration of the server 100, illustrated in FIGS. 4 and 5, enables the server 100 to function as a RAID apparatus.

Figure 6:
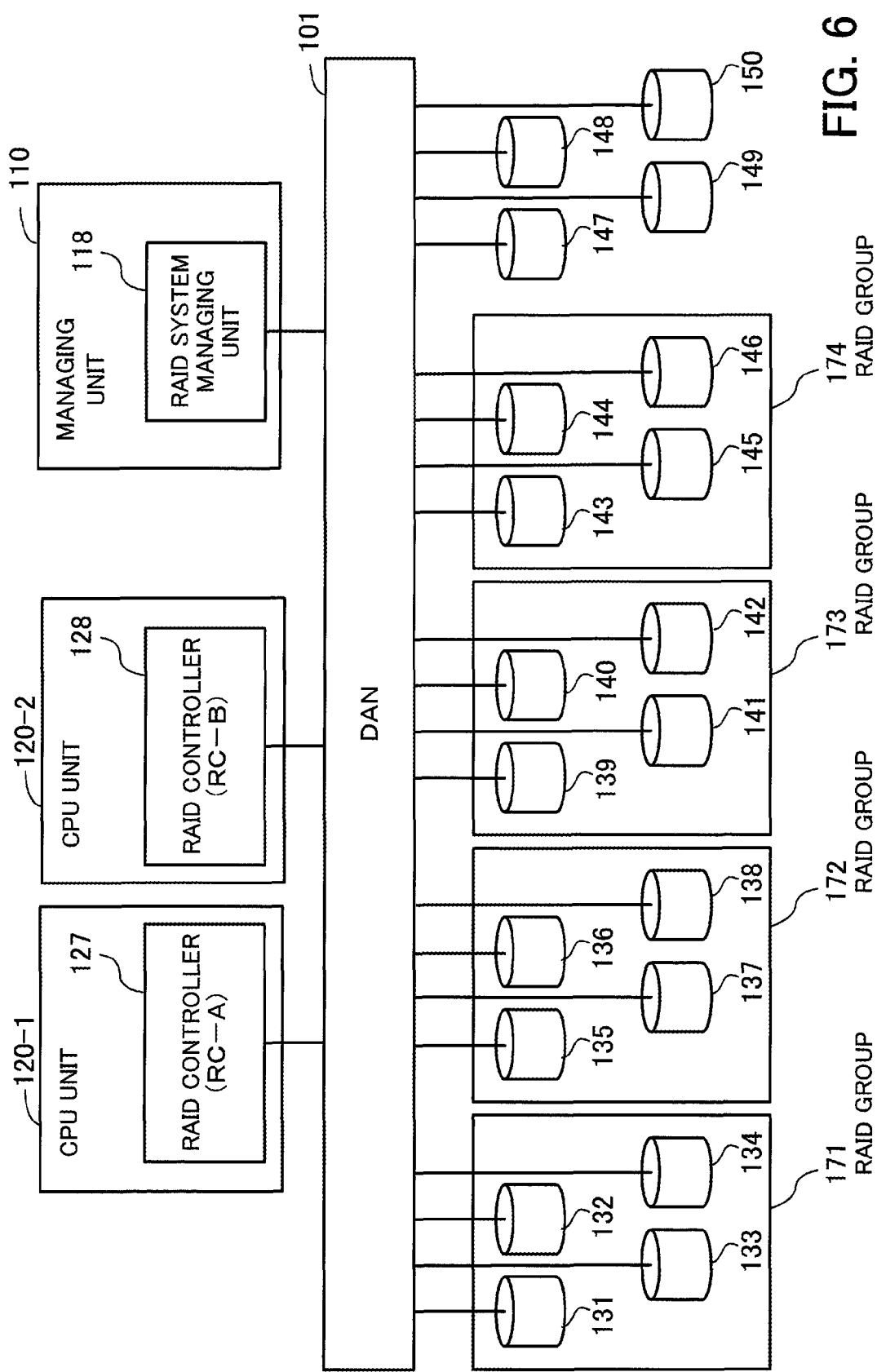
FIG. 6 is a block diagram illustrating an example of RAID functions implemented by the server.

FIG. 6 is a block diagram illustrating an example of RAID functions implemented by a server. In the example of FIG. 6, two CPU units, 120-1 and 120-2, function as RAID controllers 127 and 128. The RAID controllers 127 and 128 have identifiers "RC-A" and "RC-B", respectively. The HDDs in the storage drive pool 103 are organized into multiple RAID groups 171 to 174. The RAID group 171 includes the HDDs 131 to 134; the RAID group 172 includes the HDDs 135 to 138; the RAID group 173 includes the HDDs 139 to 142; and the RAID group 174 includes the HDDs 143 to 146. The HDDs 147 to 150 are not in use and do not belong to any RAID group.

The managing unit 110 functions as a RAID system managing unit 118 configured to combine a CPU unit and multiple HDDs to form a RAID system and manage operation of the RAID system. For example, the RAID system managing unit 118 causes one CPU unit to function as a RAID controller and causes multiple HDDs to function as a RAID group under the control of the RAID controller. In addition, in the event a failure occurs in a HDD of a RAID group, the RAID system managing unit 118 selects a RAID controller to execute a rebuild process for the RAID group including the failed HDD, and subsequently instructs the selected RAID controller to execute the rebuild process.

Connection and disconnection of communication between the RAID controllers 127 and 128 and the RAID groups 171 to 174 are controlled by the RAID system managing unit 118. For example, in the case of executing a rebuild process for a RAID group with a HDD failure, the RAID controller to control the rebuild-target RAID group is switched from one to another under the control of the RAID system managing unit 118 of the managing unit 110.

Figure 7:
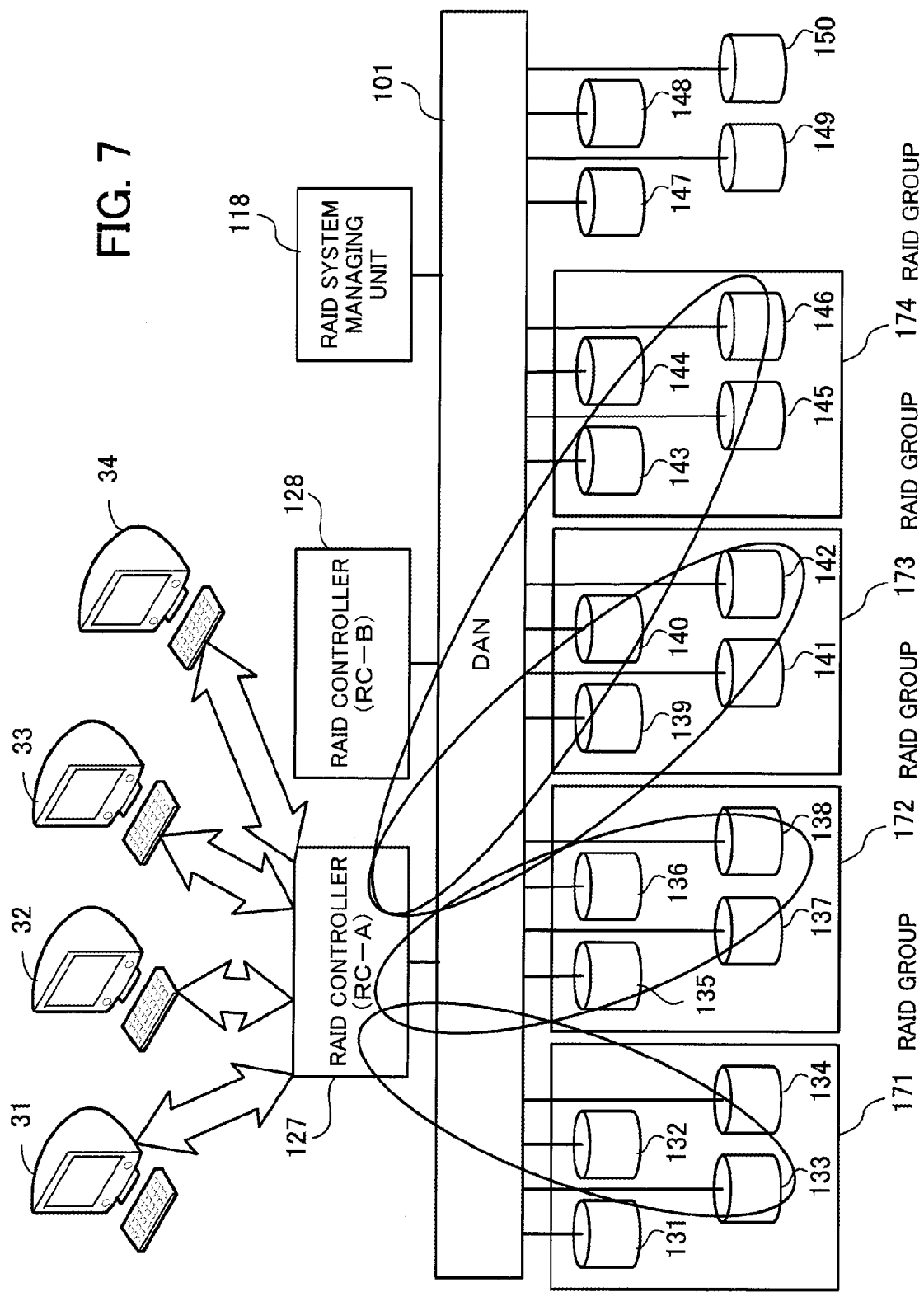
FIG. 7 illustrates a first state of a first exemplified state transition of a RAID system.
Figure 8:
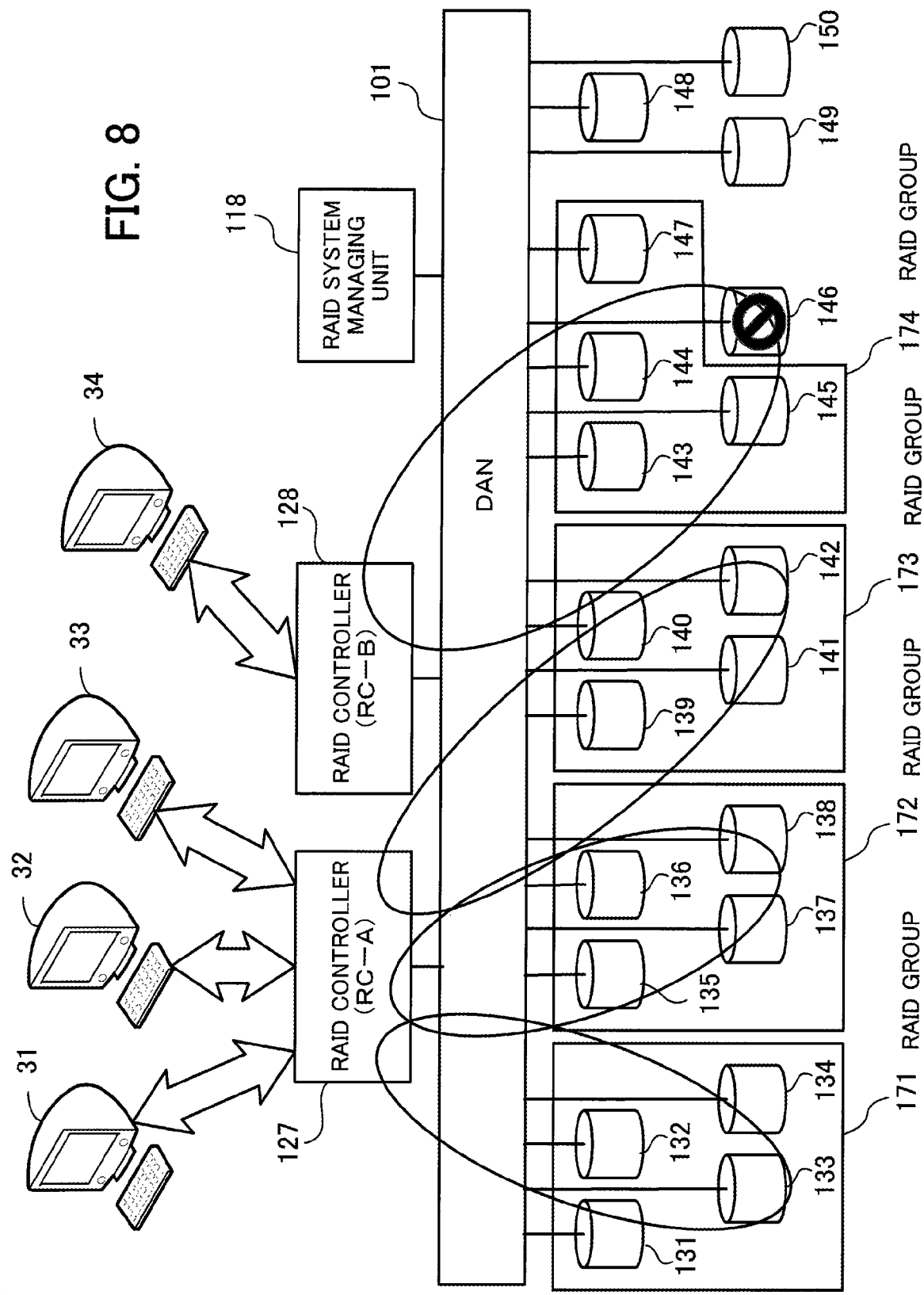
FIG. 8 illustrates a second state of the first exemplified state transition of the RAID system.

With reference to FIGS. 7 and 8, next described is an example of switching the RAID controller to control the rebuild-target RAID group from one to another. FIG. 7 illustrates a first state of a first exemplified state transition of a RAID system. In the example of FIG. 7, the four RAID groups 171 to 174 are controlled by the RAID controller 127. Assume here that the terminal 31 uses the RAID group 171; the terminal 32 uses the RAID group 172; the terminal 33 uses the RAID group 173; and the terminal 34 uses the RAID group 174. Therefore, the terminals 31 to individually access the corresponding RAID groups 171 to 174 via the RAID controller 127. Then assume that, under the circumstances, the HDD 146 belonging to the RAID group 174 fails. The HDD failure is detected by the RAID controller 127, which subsequently notifies the RAID system managing unit 118 of an identification number of the failed HDD 146. Upon receiving the notification, the RAID system managing unit 118 changes the RAID controller to control the RAID group 174 from the RAID controller 127 to the RAID controller 128.

FIG. 8 illustrates a second state of the first exemplified state transition of the RAID system. The RAID group 174 originally including the failed HDD 146 is now controlled by the RAID controller 128. In addition, the failed HDD 146 has been removed from the RAID group 174 and a different HDD 147 is added thereto. Immediately after the HDD 147 is added to the RAID group 174, the RAID group 174 is in a degraded state (i.e., a state where data redundancy has been lost). Therefore, the RAID controller 128 executes a rebuild process for the RAID group 174. In the rebuild process, the RAID controller 128 recreates data stored in the failed HDD 146 based on data of the HDDs 143 to 145 originally included in the RAID group 174, and writes the recreated data to the HDD 147. With this, the data redundancy of the RAID group 174 is restored.

In this manner, the RAID controller 128 for executing the rebuild process controls the rebuild-target RAID group 174 only. On the other hand, the RAID groups 171 to 173 other than the RAID group 174 are controlled by the RAID controller 127 different from the RAID controller 128 in charge of the rebuild process. Therefore, even if the RAID controller 128 executes the rebuilt process, access to the RAID groups 171 to 173 via the RAID controller 127 is made with processing efficiency equal to or better than that before the rebuild process. That is, this embodiment prevents the execution of the rebuild process from adversely affecting RAID groups other than the rebuild-target RAID group.

Figure 9:
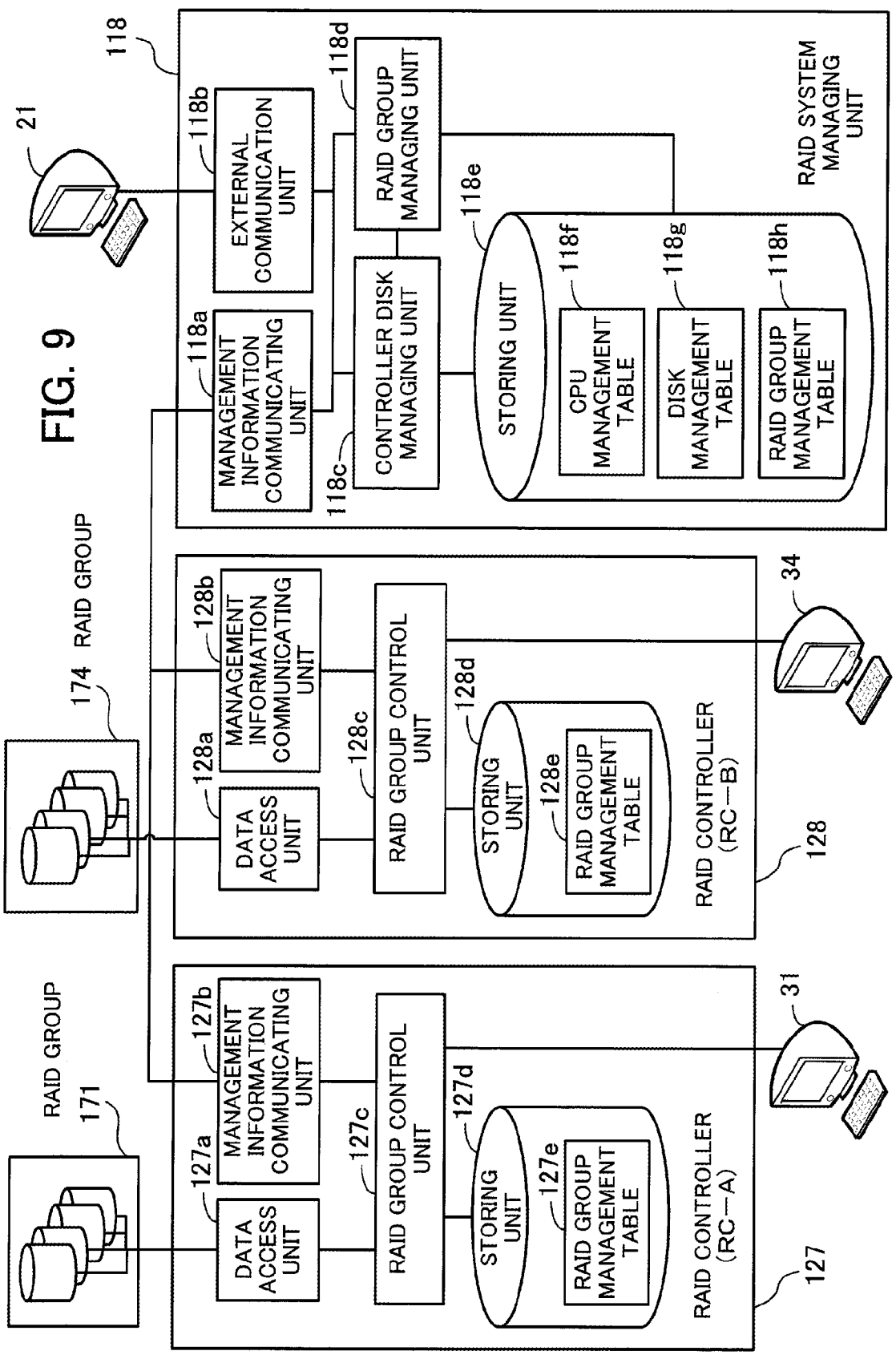
FIG. 9 is a block diagram illustrating an example of internal functions of RAID controllers and a RAID system managing unit.

The following gives a detailed description of functions of the RAID controllers 127 and 128 and the RAID system managing unit 118 used to ensure the process of FIGS. 7 and 8. FIG. 9 is a block diagram illustrating an example of internal functions of RAID controllers and a RAID system managing unit. Note that FIG. 9 depicts a connection configuration obtained when the RAID controllers 127 and 128 control the RAID groups 171 and 174, respectively.

The RAID controller 127 accesses the RAID group 171 at the request of the terminal 31. In order to control the RAID group 171, the RAID controller 127 includes a data access unit 127a, a management information communicating unit 127b, a RAID group control unit 127c, and a storing unit 127d.

The data access unit 127a accesses the RAID group 171 for data retrieval and storage. For example, the data access unit 127a carries out data writing and reading operations using physical addresses associated with data sectors on the HDDs making up the RAID group 171.

The management information communicating unit 127b communicates management information with the RAID system managing unit 118. Examples of the management information include an abnormality notification sent from the RAID controller 127 to the RAID system managing unit 118 in the case of detecting a HDD failure; and an instruction to establish a connection with a RAID group, sent from the RAID system managing unit 118 to the RAID controller 127.

The RAID group control unit 127c controls the control-target RAID group 171. Specifically, when a data access request is made by the terminal 31, the RAID group control unit 127c controls access to the RAID group 171 according to a RAID level of the RAID group 171. Let us consider the case where the access control is implemented in a data write operation. If the RAID level of the RAID group 171 is RAID 5, for example, the RAID group control unit 127c instructs the data access unit 127a to write data by striping the data with parity data across several HDDs. Striping is a data storage technique for spreading data across multiple HDDs, and parity data is error correction codes. If data is lost due to a failure of one HDD among multiple HDDs, the lost data may be recreated from parity data and data on the remaining HDDs. If the RAID level of the RAID group 171 is RAID 1, the RAID group control unit 127c instructs the data access unit 127a to write data by mirroring (duplicating) the data across multiple HDDs.

In addition, the RAID group control unit 127c detects a failure of a HDD in the control-target RAID group 171. For example, when data access to the RAID group 171 is unsuccessful, the RAID group control unit 127c determines that a HDD in the access-target RAID group 171 has failed. Upon detecting a HDD failure, the RAID group control unit 127c transmits an abnormal notification to the RAID system managing unit 118 via the management information communicating unit 127b.

If the control-target RAID group 171 falls into a degraded state, the RAID group control unit 127c executes a rebuild process for the RAID group 171 to restore data redundancy. The RAID group control unit 127c starts the rebuild process, for example, in response to a rebuild start instruction of the RAID system managing unit 118.

The storing unit 127d stores information of the RAID group 171 under the control of the RAID controller 127. In the storing unit 127d, for example, a RAID group management table 127e is stored, in which various types of information used to control the RAID group 171 is registered. The RAID group management table 127e is described later in detail (see FIG. 10). As the storing unit 127d, for example, a part of the storage area in the RAM 122 or the flash memory 123 of the CPU unit 120-1 is used.

The RAID controller 128 accesses the RAID group 174 at the request of the terminal 34. In order to control the RAID group 174, the RAID controller 128 includes a data access unit 128a, a management information communicating unit 128b, a RAID group control unit 128c, and a storing unit 128d. The data access unit 128a, the management information communicating unit 128b, the RAID group control unit 128c, and the storing unit 128d respectively have identical functions as the components with the same names in the RAID controller 127.

The RAID system managing unit 118 instructs the RAID controller 127/128 to execute a rebuild process. Note that the instruction to execute a rebuild process includes an instruction to the RAID controller 127/128 in charge of the rebuild process to establish a connection with the rebuild-target RAID group 171/174. In order to instruct execution of a rebuild process, the RAID system managing unit 118 includes a management information communicating unit 118a, an external communication unit 118b, a controller disk managing unit 118c, a RAID group managing unit 118d, and a storing unit 118e.

The management information communicating unit 118a communicates management information with the RAID controllers 127 and 128. The external communication unit 118b communicates with the administrative terminal 21. For example, the external communication unit 118b receives, from the terminal 21, an instruction to establish a connection between a RAID controller and a RAID group. Subsequently, the external communication unit 118b transfers the received connection instruction to the controller disk managing unit 118c. The controller disk managing unit 118c manages a connection between a RAID controller and HDDs making up a RAID group controlled by the RAID controller. For example, the controller disk managing unit 118c controls the DAN 101 to establish communication between the RAID controller and the HDDs.

The RAID group managing unit 118d manages the RAID groups 171 and 174 as well as instructs the individual RAID controllers 127 and 128 to control the corresponding RAID groups 171 and 174. For example, the RAID group managing unit 118d manages RAID levels and statuses of the RAID groups 171 and 174. RAID group statuses include "normal" (data redundancy of a RAID group remains maintained) and "degraded" (data redundancy is lost), for example. In addition, the RAID group managing unit 118d instructs a RAID controller controlling a RAID group in a degraded state to start a rebuild process for the degraded RAID group. The storing unit 118e stores therein information to be used by the RAID system managing unit 118 in managing the RAID system. For example, the storing unit 118e stores a CPU management table 118f, a disk management table 118g, and a RAID group management table 118h. The information stored in the storing unit 118e is described later in detail (see FIGS. 12 through 14).

In FIG. 9, lines connecting the individual components represent only part of communication paths, and communication paths other than those illustrated are also configurable.

Figure 10:
FIG. 10 illustrates an example of a RAID group management table held by a RAID controller "RC-A"

Next, information stored in the individual storing units 127d, 128d, and 118e is described in detail. FIG. 10 illustrates an example of a RAID group management table held by a RAID controller "RC-A". In the storing unit 127d of the RAID controller 127 with the identifier "RC-A", for example, the RAID group management table 127e as illustrated in FIG. 10 is stored. The RAID group management table 127e includes columns named RAID-ID, level, status, attribute, and disk list.

In a field of the RAID-ID column, an identifier of a RAID group (RAID-ID) under the control of the RAID controller 127 with the identifier "RC-A" is entered. In a corresponding field of the level column, a RAID level of the RAID group is entered. In a corresponding field of the status column, a status of the RAID group is entered. A status to be entered is, for example, one of the following: normal, degraded, rebuild in progress, and failed. The status "normal" indicates that data redundancy remains maintained. The status "degraded" indicates that data redundancy has been lost but a rebuild process has yet to be executed. The status "rebuild in progress" indicates that a rebuild process to restore data redundancy is in progress. The status "failed" indicates that data redundancy has been lost and rebuilding data redundancy is impossible. For example, multiple HDDs of a RAID group organized in RAID 5 level failing at once may results in unrecoverable loss of data on the RAID group. In a corresponding field of the attribute column, information used to manage the RAID group, such as an Internet Protocol address to access the RAID group, is entered. In a corresponding field of the disk list column, an identifier of one or more HDDs (HDD-ID) included in the RAID group is entered. According to the example of FIG. 10, the RAID controller 127 controls a RAID group with a RAID-ID "RAID-a". The RAID group is operating normally in a RAID level "RAID 5" using HDDs identified by HDD-IDs "DISK-A", "DISK-B", "DISK-C", and "DISK-D".

Figure 11:
FIG. 11 illustrates an example of a RAID group management table held by a RAID controller "RC-B"

FIG. 11 illustrates an example of a RAID group management table held by a RAID controller "RC-B". In the storing unit 128d of the RAID controller 128 with the identifier "RC-B", for example, the RAID group management table 128e as illustrated in FIG. 11 is stored. The RAID group management table 128e includes columns named RAID-ID, level, status, attribute, and disk list. In the individual columns of the RAID group management table 128e, the same column names as in the RAID group management table 127e of FIG. 10 and similar information are entered. According to the example of FIG. 11, the RAID controller 128 controls a RAID group with a RAID-ID "RAID-b". The RAID group is in operation in a RAID level "RAID 1" but has currently fallen into a degraded state due to a failure of one of two HDDs identified by HDD-IDs "DISK-E" and "DISK-F" included in the RAID group.

FIG. 12 illustrates an example of a CPU management table held by a RAID system managing unit. The CPU management table 118f includes columns named CPU-ID, status, attribute, and connected disk list. In each field of the CPU-ID column, an identifier of a CPU unit (CPU-ID) installed in the server 100 is entered. In a corresponding field of the status column, a status of the CPU unit is entered. A status to be entered is, for example, one of the following: assigned, unassigned, and failed. The status "assigned" indicates that the CPU unit has currently been assigned to function as a RAID controller. The status "unassigned" indicates that the CPU unit is not assigned to function as a RAID controller. The status "failed" indicates that the CPU unit is out of order. In a corresponding field of the attribute column, information used to manage the CPU unit is entered. In a corresponding field of the connected disk list column, an identifier of one or more HDDs (HDD-ID) connected to the CPU unit is entered. According to the example of FIG. 12, CPU units with identifiers "CPU-01" and "CPU-02" function as RAID controllers, and multiple HDDs are connected to each of the CPU units.

FIG. 13 illustrates an example of a disk management table held by a RAID system managing unit. The disk management table 118g includes columns named DISK-ID, status, attribute, and connected CPU-ID. In each field of the DISK-ID column, an identifier of a HDD (DISK-ID) installed in the server 100 is entered. In a corresponding field of the status column, a status of the HDD is entered. A status to be entered is, for example, one of the following: assigned, unassigned, and failed. The status "assigned" indicates that the HDD has currently been assigned to a RAID group. The status "unassigned" indicates that the HDD is not assigned to any RAID group. The status "failed" indicates that the HDD is failed. In a corresponding field of the attribute column, information used to manage the HDD is entered. In a corresponding field of the connected CPU-ID column, an identifier of a CPU unit (CPU-ID) to which the HDD is connected is entered. According to the example of FIG. 13, each of HDDs with identifiers "DISK-A", "DISK-B", "DISK-C", "DISK-D", "DISK-E", and "DISK-F" has been assigned to a RAID group, although a HDD with an identifier "DISK-G" is currently not assigned to any RAID group. A HDD with an identifier "DISK-H" has failed.

FIG. 14 illustrates an example of a RAID group management table held by a RAID system managing unit. The RAID group management table 118h includes columns named RAID-ID, level, status, attribute, connection-target CPU, and disk list. In the individual columns of the RAID group management table 118h except for the connection-target CPU column, the same column names as in the RAID group management table 127e of FIG. 10 and similar information are entered. Note however that the RAID group management table 118h held by the system managing unit 118 contains information of all the RAID groups installed in the server 100. In each field of the connection-target CPU column, an identifier of a CPU unit (CPU-ID) which includes a RAID controller controlling a RAID group indicated by a corresponding RAID-ID is entered.

Information registered in the individual tables of FIGS. 10 through 14 is used to construct and manage a RAID system in the server 100. The construction of the RAID system involves a process of connecting multiple HDDs (disk group) to a RAID controller. The RAID controller controls the connected disk group as a RAID group and provides a terminal with an environment to access the RAID group.

Figure 15:
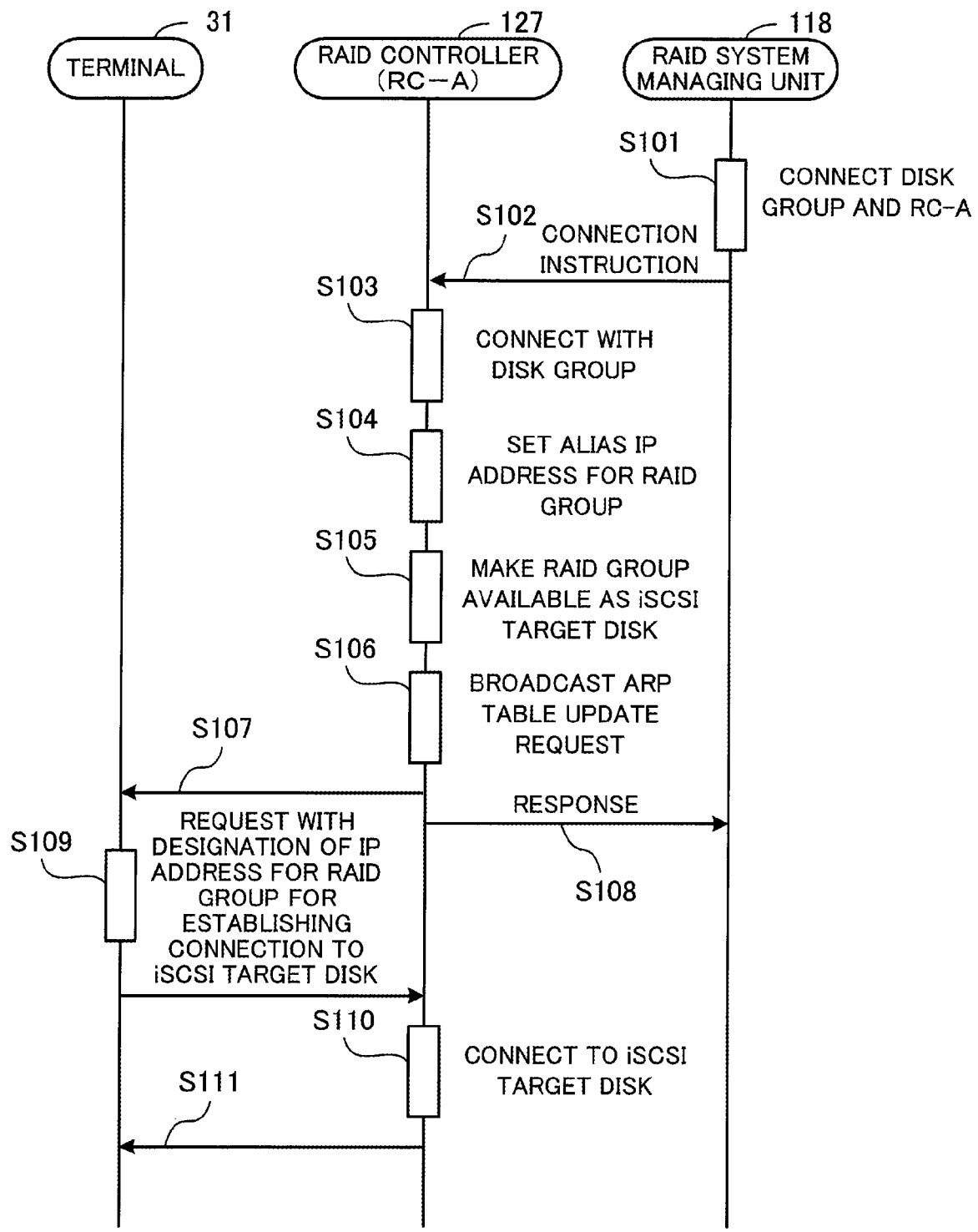
FIG. 15 is a sequence diagram illustrating procedures for connecting a disk group to a RAID controller.

FIG. 15 is a sequence diagram illustrating procedures for connecting a disk group to a RAID controller. FIG. 15 depicts procedures taken to connect the RAID group 171 used by the terminal 31 to the RAID controller 127. The procedures of FIG. 15 are described next according to the step numbers in the sequence diagram.

[Step S101] The RAID system managing unit 118 connects the RAID controller 127 with the identifier "RC-A" and a disk group. Specifically, an administrator inputs, to the terminal 31, an instruction to connect a disk group to the RAID controller 127. In response to the input, the connection instruction is transmitted from the terminal 31 to the RAID system managing unit 118. The external communication unit 118b of the RAID system managing unit 118 receives the connection instruction, which is then transferred to the controller disk managing unit 118c. The controller disk managing unit 118c controls the DAN 101 to thereby connect the HDDs 131 to 134 to the RAID controller 127.

After the connection is established, the controller disk managing unit 118c updates the CPU management table 118f and the disk management table 118g. For example, the CPU management table 118f is updated in such a manner that an entry in the status column, corresponding to the CPU-ID of the CPU unit 120-1 is changed to "assigned" and a corresponding entry in the connected disk list column is changed to DISK-IDs of the HDDs 131 to 134. On the other hand, in the disk management table 118g, entries in the status, individually corresponding to the HDDs 131 to 134 are all changed to "assigned" and corresponding entries in the connected CPU-ID column are changed to the CPU-ID of the CPU unit 120-1.

[Step S102] The RAID system managing unit 118 transmits an instruction to the RAID controller 127 to make a connection with the HDDs 131 to 134. For example, the controller disk managing unit 118c of the RAID system managing unit 118 transmits the connection instruction to the RAID controller 127 via the management information communicating unit 118a.

[Step S103] The RAID controller 127 recognizes the disk group in an operating system (OS), and makes a software-based connection to the disk group so as to establish a logical connection to enable communication via the DAN 101. Specifically, the RAID group control unit 127c of the RAID controller 127 receives an instruction to make a connection with the HDDs 131 to 134, from the RAID system managing unit 118 via the management information communicating unit 127b. The RAID group control unit 127c recognizes, in the operating system, the HDDs 131 to 134 connected via the DAN 101 using a function called Plug and Play, for example. In addition, the RAID group control unit 127c establishes a communication connection with the HDDs 131 to 134. Note that the RAID group control unit 127c may also detect the connection of the HDDs 131 to 134 via the DAN 101 without waiting for the connection instruction of the RAID system managing unit 118, and recognize the HDDs 131 to 134 in the operating system. When connecting the disk group, the RAID group control unit 127c registers entries regarding the connected disk group in the RAID group management table 127e. The registered entries include, for example, a RAID-ID of the RAID group 171; a RAID level of the RAID group 171; a status "normal"; and a list of DISK-IDs of the HDDs 131 to 134 configured as the RAID group 171.

[Step S104] The RAID controller 127 sets an alias Internet Protocol (IP) address for the RAID group 171 in the operating system. Besides an Internet Protocol address of the RAID controller 127, the alias Internet Protocol address is used to receive packets in communication via the network switch 22. Setting the alias Internet Protocol address allows the RAID controller 127 to receive packets directed to the Internet Protocol address uniquely identifying the RAID group 171. After setting the alias Internet Protocol address in the operating system, the RAID controller 127 enters an Internet Protocol address set as the alias Internet Protocol address into the RAID group management table 127e, more specifically into a field of the attribute column, corresponding to the entries registered in step S103.

[Step S105] The RAID group control unit 127c of the RAID controller 127 makes the connected RAID group 171 available as an Internet Small Computer System Interface (iSCSI) target disk. This allows a connection to be established from a terminal to the RAID group 171.

[Step S106] The RAID group control unit 127c of the RAID controller 127 broadcasts a request to update an Address Resolution protocol (ARP) table via the network switch 22. The ARP table update request includes the Internet Protocol address for the RAID group 171.

[Step S107] The broadcast ARP table update request is received by the terminal 31.

[Step S108] The RAID group control unit 127c of the RAID controller 127 transmits, to the RAID system managing unit 118, a response to the instruction to make a connection with the disk group (the HDDs 131 to 134). In the RAID system managing unit 118, the RAID group managing unit 118d registers entries including information on the RAID group 171 in the RAID group management table 118h according to the response. The registered entries includes, for example, a RAID-ID of the RAID group 171; a RAID level of the RAID group 171; a status "normal"; and a list of DISK-IDs of the HDDs 131 to 134 making up the RAID group 171. The registered entries also include the CPU-ID "CPU-01" of the CPU unit 120-1 and the Internet Protocol address for the RAID group 171, which are individually entered in corresponding fields of the connection target CPU column and the attribute column, respectively, in the RAID group management table 118h.

[Step S109] The terminal 31 transmits a request with designation of the Internet Protocol address for the RAID group 171 for establishing a connection to the iSCSI target disk.

[Step S110] The RAID group control unit 127c of the RAID controller 127 receives the connection request transmitted from the terminal 31, and subsequently carries out a process of connecting the terminal 31 to the iSCSI target disk.

[Step S111] The RAID group control unit 127c of the RAID controller 127 returns the result of the connection process to the terminal 31.

With the transmission of the access request with designation of the Internet Protocol address for the RAID group 171, access to the RAID group 171 becomes available to the terminal 31.

FIG. 15 illustrates the process of connecting the RAID group 171 to the RAID controller 127. The remaining RAID groups 172 to 174 may be connected to the RAID controller 127 in the same manner. The four RAID groups 171 to 174 connected to the RAID controller 127 results in the configuration illustrated in FIG. 7, i.e. a RAID system with the four RAID groups 171 to 174. Then, if a HDD in one of the RAID groups 171 to 174 fails, the RAID controller controlling the RAID group including the failed HDD is switched from one (127 in this case) to another and a rebuild process for the RAID group is carried out.

Figure 16:
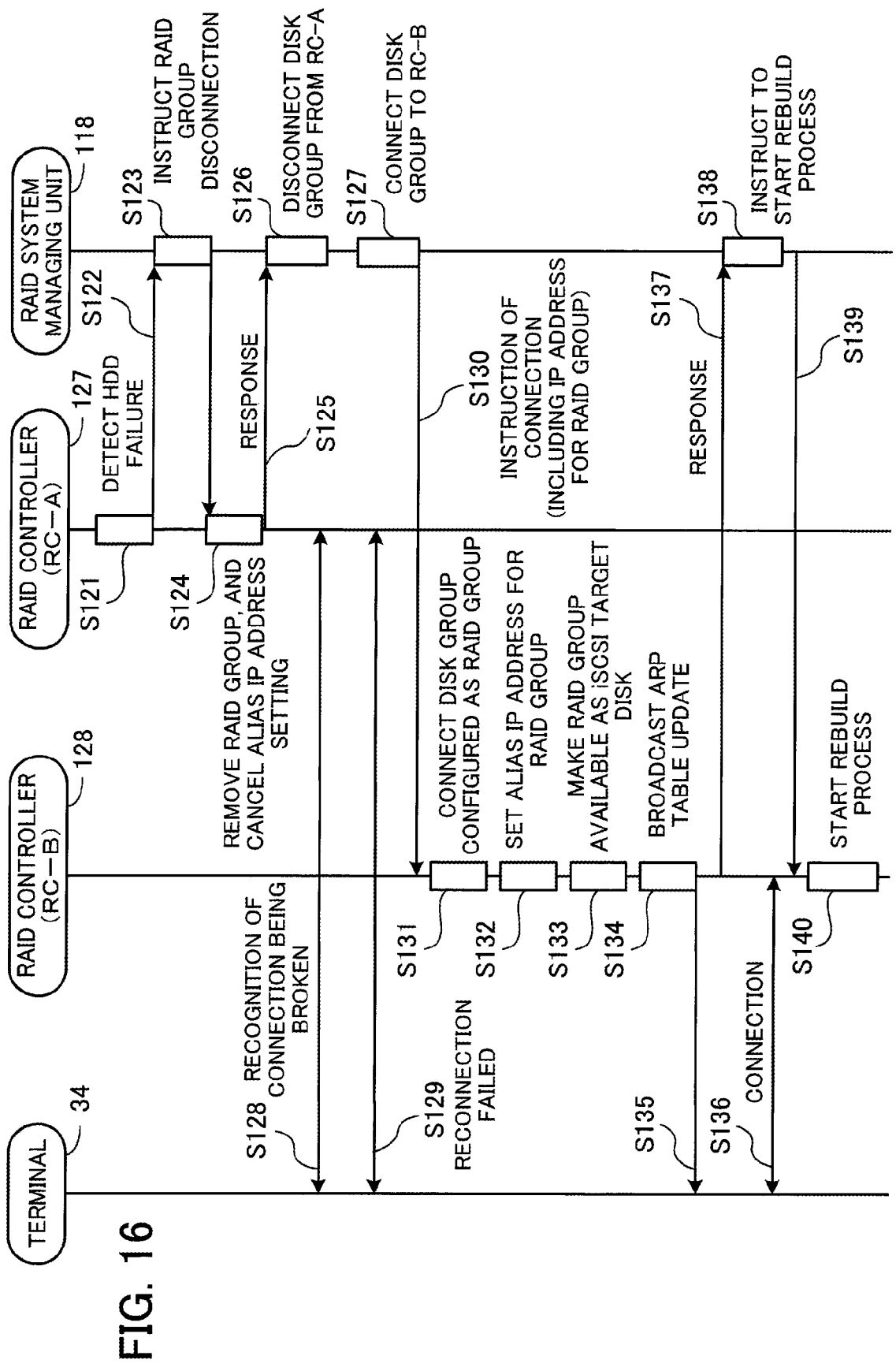
FIG. 16 is a sequence diagram illustrating an example of procedures related to RAID controller switching and a subsequent rebuilt process in response to failure detection.

FIG. 16 is a sequence diagram illustrating an example of procedures related to RAID controller switching and a subsequent rebuilt process in response to failure detection. Assuming here that the HDD 146 (see FIG. 7) of the RAID group 174 fails, the following descries the process procedures of FIG. 16 according to the step numbers in the sequence diagram.

[Step S121] The RAID controller 127 detects a failure of the HDD 146. For example, the RAID group control unit 127c of the RAID controller 127 determines a failure of the HDD 146 when a data write or read operation for the HDD 146 is unsuccessful.

[Step S122] The RAID group control unit 127c of the RAID controller 127 transmits an abnormality notification indicating the failure of the HDD 146 to the RAID system management unit 118.

[Step S123] The RAID group managing unit 118d of the RAID system managing unit 118 receives the abnormality notification from the RAID controller 127, and then transmits an instruction to the RAID controller 127 to disconnect the RAID group 174 from the RAID controller 127.

[Step S124] The RAID group control unit 127c of the RAID controller 127 removes the RAID group 174 from control targets of the RAID controller 127. The RAID group control unit 127c also cancels the setting of the Internet Protocol address of the RAID group 174 to function as an alias Internet Protocol. At this point, the RAID group control unit 127c deletes entries corresponding to the RAID group 174 from the RAID group management table 127e.

[Step S125] The RAID group control unit 127c of the RAID controller 127 transmits, to the RAID system managing unit 118, a response indicating that the disconnection of the RAID group 174 has been completed.

[Step S126] Upon receiving the response of the RAID controller 127, the RAID group managing unit 118d of the RAID system managing unit 118 instructs the controller disk managing unit 118c to replace the failed HDD 146 of the RAID group 174 with a new normal HDD and change the RAID controller for controlling the RAID group 174. In response to the instruction, the controller disk managing unit 118c controls the DAN 101 to disconnect the disk group (the HDDs 143 to 146) forming the RAID group 174 from the RAID controller 127. At this point, the controller disk managing unit 118c updates the CPU management table 118f and the disk management table 118g. Specifically, as for the CPU management table 118f, the controller disk managing unit 118c deletes the DISK-IDs of the HDDs 143 to 146 from a field of the connected disk list column, corresponding to the CPU-ID of the CPU unit 120-1. As for the disk management table 118g, the controller disk managing unit 118c changes entries in the status column, corresponding to the HDDs 143 to 146, to "unassigned" and deletes the CPU-ID set in corresponding fields of the connected CPU-ID column.

[Step S127] The RAID system managing unit 118 removes the HDD 146 from the disk group of the RAID group 174 and adds the HDD 147 thereto. Subsequently, the RAID system managing unit 118 controls the DAN 101 to connect the disk group (the HDDs 143 to 145, and 147) of the RAID group 174 to the RAID controller 128 with the identifier "RC-B". At this point, the controller disk managing unit 118c updates the CPU management table 118f and the disk management table 118g. Specifically, as for the CPU management table 118f, the controller disk managing unit 118c enters the DISK-IDs of the HDDs 143 to 145, and 147 in a field of the connected disk list column, corresponding to a CPU-ID of the CPU unit 120-2. As for the disk management table 118g, the controller disk managing unit 118c changes entries in the status column, corresponding to the HDDs 143 to 145, and 147 to "assigned" and enters the CPU-ID of the CPU unit 120-2 in corresponding fields of the connected CPU-ID column.

[Step S128] When the RAID controller 127 disconnects the RAID group 174 therefrom, the terminal 34 using the RAID group 174 recognizes that the connection to the RAID group 174 is broken.

[Step S129] The terminal 34 tries to have the RAID controller 127 reconnect the terminal 34 to the RAID group 174, but fails.

[Step S130] On the other hand, after connecting the disk group (the HDDs 143 to 145, and 147) to the RAID controller 128 with the identifier "RC-B", the RAID system managing unit 118 transmits, to the RAID controller 128, a connection instruction including an Internet Protocol address for the RAID group 174.

[Step S131] The RAID controller 128 recognizes the disk group in an operating system, and makes a software-based connection to the disk group. Details of the process in this step are the same as those in step S103 of FIG. 15.

[Step S132] The RAID controller 128 sets, in the operating system, the Internet Protocol address included in the connection instruction as an alias Internet Protocol address for the RAID group 174. Details of the process in this step are the same as those in step S104 of FIG. 15.

[Step S133] The RAID group control unit 128c of the RAID controller 128 makes the connected RAID group 174 available as an iSCSI target disk.

[Step S134] The RAID group control unit 128c of the RAID controller 128 broadcasts a request to update an ARP table via the network switch 22.

[Step S135] The broadcast ARP table update request is received by the terminal 34.

[Step S136] In response to the request for the ARP table update, the terminal 34 updates its own ARP table. Subsequently, the terminal 34 carries out a process of connecting to the RAID group 174 via the RAID controller 128. Details of the process in this step are the same as those in steps S109 through S111.

[Step S137] The RAID group control unit 128c of the RAID controller 128 transmits, to the RAID system managing unit 118, a response to the instruction to make a connection with the disk group.

[Step S138] The RAID group managing unit 118d of the RAID system managing unit 118 transmits an instruction to the RAID controller 128 to start a rebuild process for the RAID group 174.

[Step S139] The RAID group control unit 128c of the RAID controller 128 receives the rebuild process start instruction.

[Step S140] The RAID group control unit 128c of the RAID controller 128 starts a rebuild process for the RAID group 174. For example, if the RAID group 174 is in RAID 5 level, the RAID group control unit 128c recreates data or parity data stored in the failed HDD 146 using data and parity data of the HDDs 143 to 145, and subsequently stores the recreated data or parity data in the HDD 147. If the RAID group 174 is in RAID 1 level, the RAID group control unit 128c copies, to the HDD 147, data of an HDD which is the same as data stored in the failed HDD 146.

In the above-described manner, the RAID group 174 including the failed HDD 146 is connected to the RAID controller 128, which subsequently executes a rebuild process for the RAID group 174.

In the example of FIGS. 7 and 8 illustrating switching of the RAID controller from one to another, the RAID controller 128 with no disk group connected thereto is present when the HDD 146 fails. On the other hand, when the HDD 146 fails, such a RAID controller may not be present. In this case, for example, a RAID controller is started in a CPU unit and, then, a degraded RAID group is connected to the RAID controller. With reference to FIGS. 17 through 20, the following describes state transition of a RAID system in the case of starting a new RAID controller when a RAID group is degraded.

Figure 17:
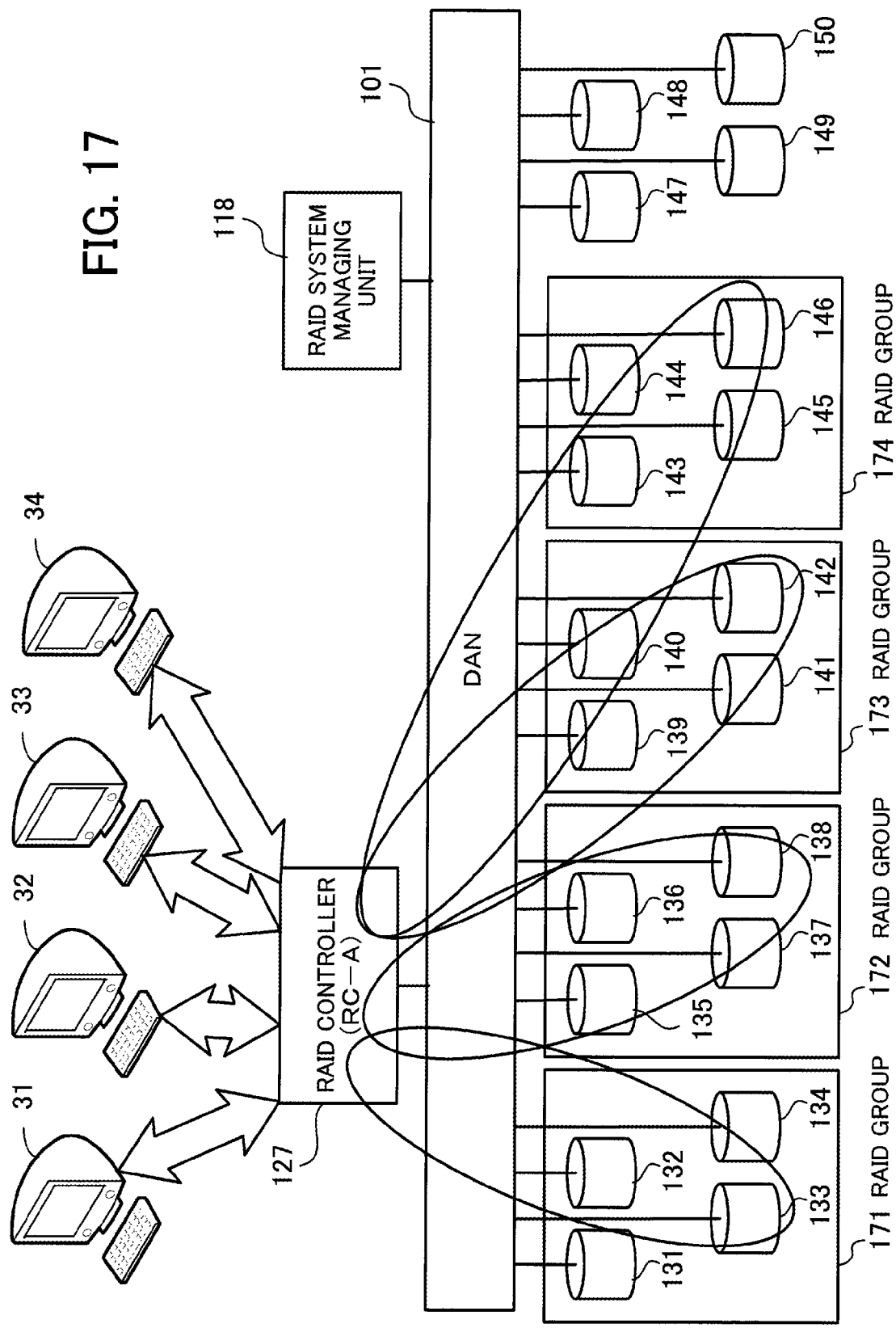
FIG. 17 illustrates a first state of a second exemplified state transition of a RAID system.

FIG. 17 illustrates a first state of a second exemplified state transition of a RAID system. The first state of FIG. 17 represents a normal operation condition. In this state, the RAID controller 127 controls the four RAID groups 171 to 174.

Figure 18:
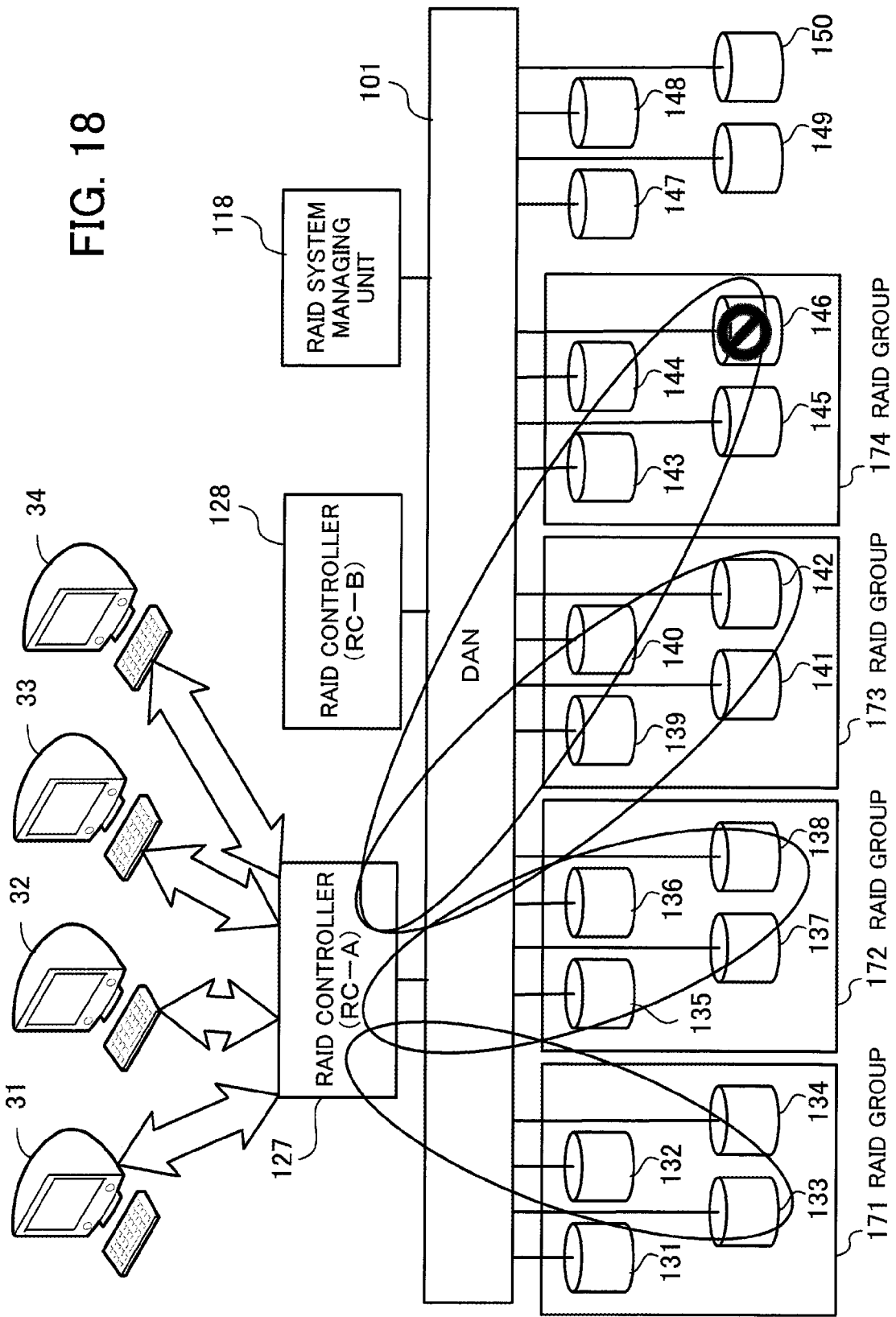
FIG. 18 illustrates a second state of the second exemplified state transition of the RAID system.

FIG. 18 illustrates a second state of the second exemplified state transition of the RAID system. The second state of FIG. 18 represents a condition where the HDD 146 fails. The failure of the HDD 146 causes the RAID group 174 including the HDD 146 to fall into a degraded state. In response, the RAID system managing unit 118 controls one CPU unit to start the RAID controller 128.

Figure 19:
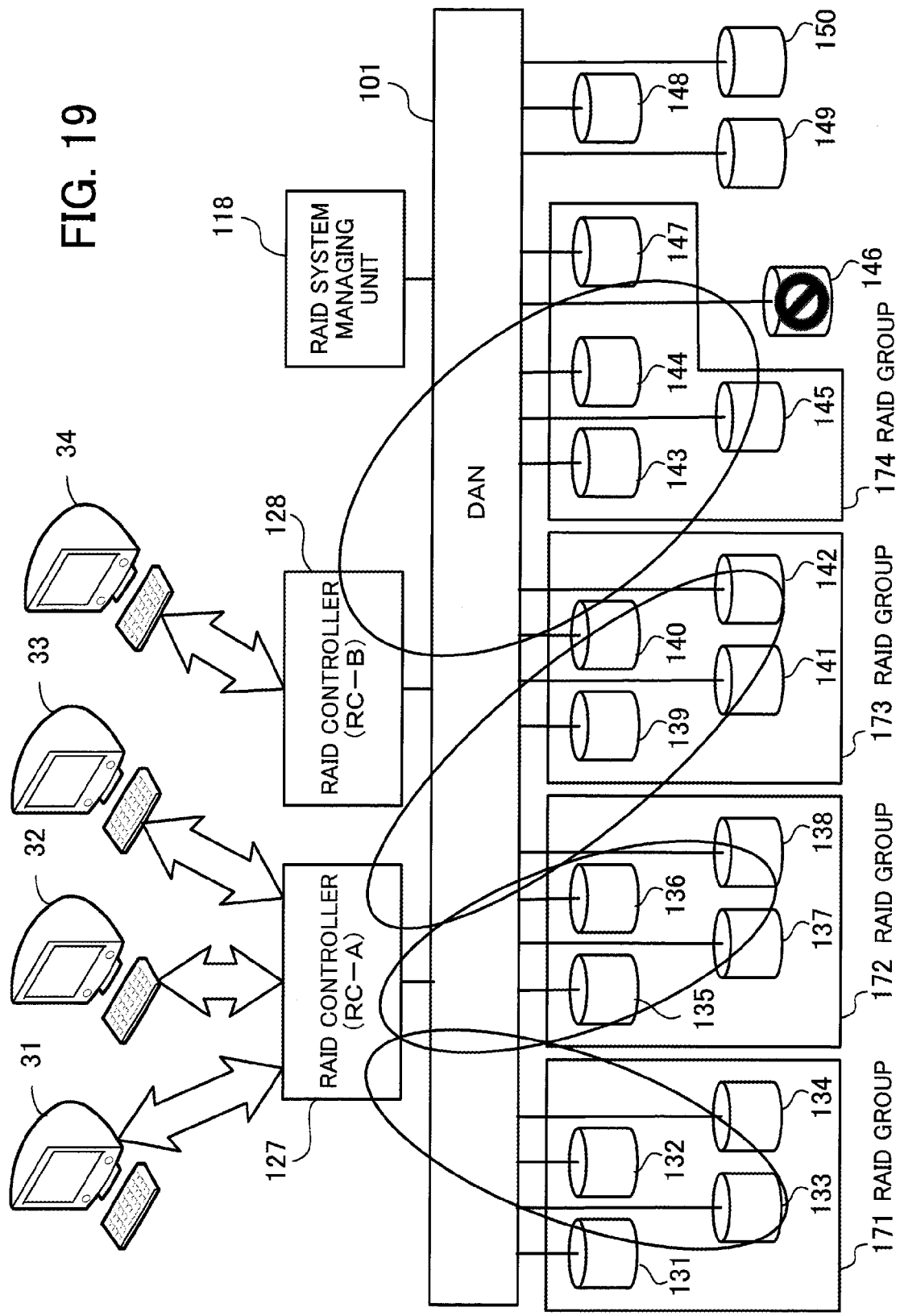
FIG. 19 illustrates a third state of the second exemplified state transition of the RAID system.

FIG. 19 illustrates a third state of the second exemplified state transition of the RAID system. The third state of FIG. 19 represents a condition after the connection target of the degraded RAID group 174 is switched to the newly started RAID controller 128. To the RAID controller 128, only the RAID group 174 is connected. Subsequently, the RAID controller 128 executes a rebuild process for the RAID group 174. While the rebuild process is in progress, the remaining RAID groups 171 to 173 are normally operating under the control of the RAID controller 127. Note that the terminal 34 making use of the RAID group 174 is able to access data in the RAID group 174 via the RAID controller 128.

Figure 20:
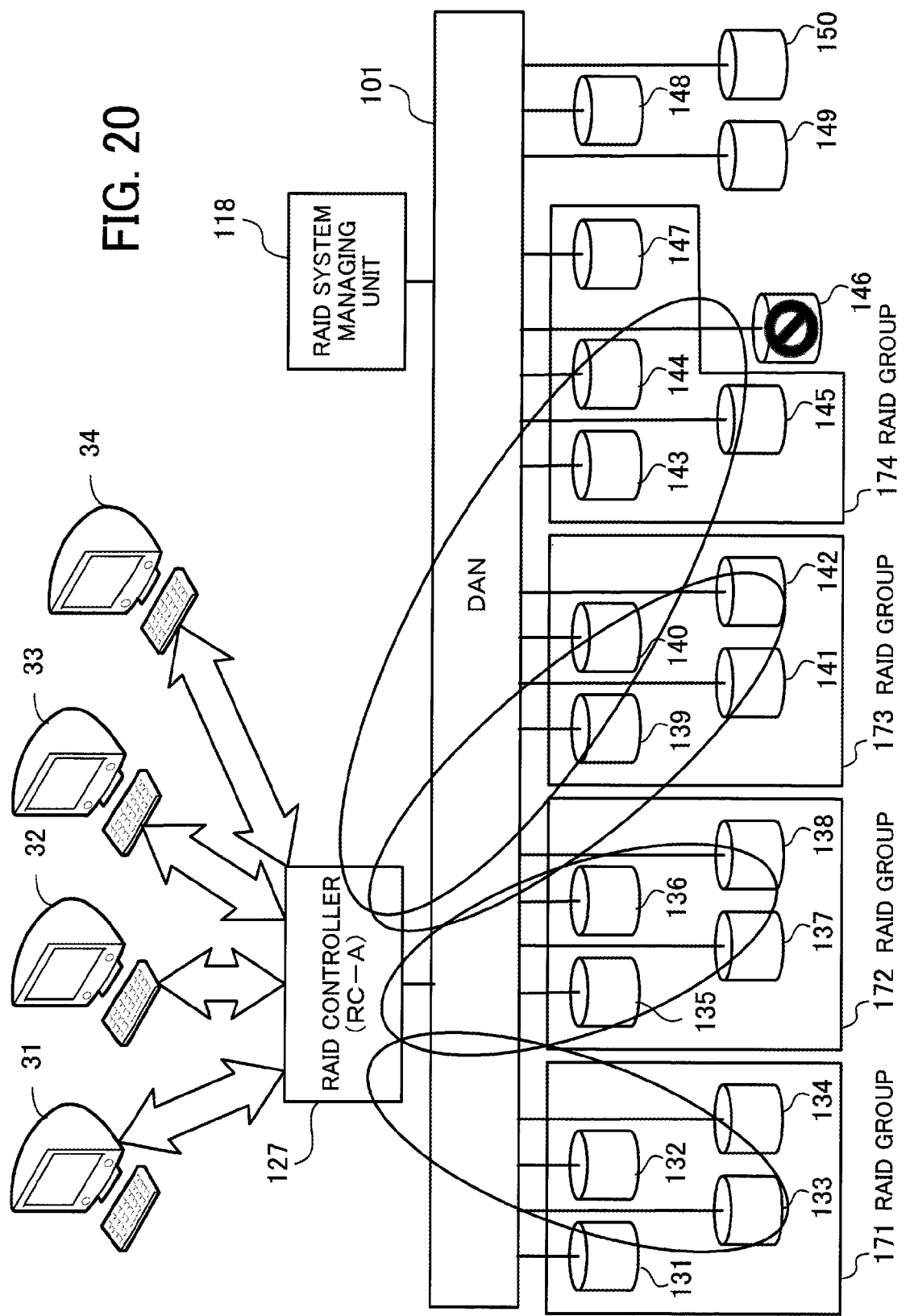
FIG. 20 illustrates a fourth state of the second exemplified state transition of the RAID system.

FIG. 20 illustrates a fourth state of the second exemplified state transition of the RAID system. The fourth state of FIG. 20 represents a condition after the rebuild process is completed. After the completion of the rebuild process, the RAID group 174 is reconnected back to the RAID controller 127. The RAID controller 128 started for the execution of the rebuild process has stopped operating. The terminal 34 is able to access data in the RAID group 174 via the RAID controller 127.

As illustrated in FIGS. 17 through 20, activating the new RAID controller 128 only during the rebuild process eliminates the need for preparing in advance a RAID controller for the rebuild process. Further, stopping the RAID controller for the rebuild process from operating after the completion of the rebuild process decreases power consumption of the server 100. Note that the operations illustrated in FIGS. 17 through 20 are carried out under the control of the RAID system managing unit 118.

Figure 21:
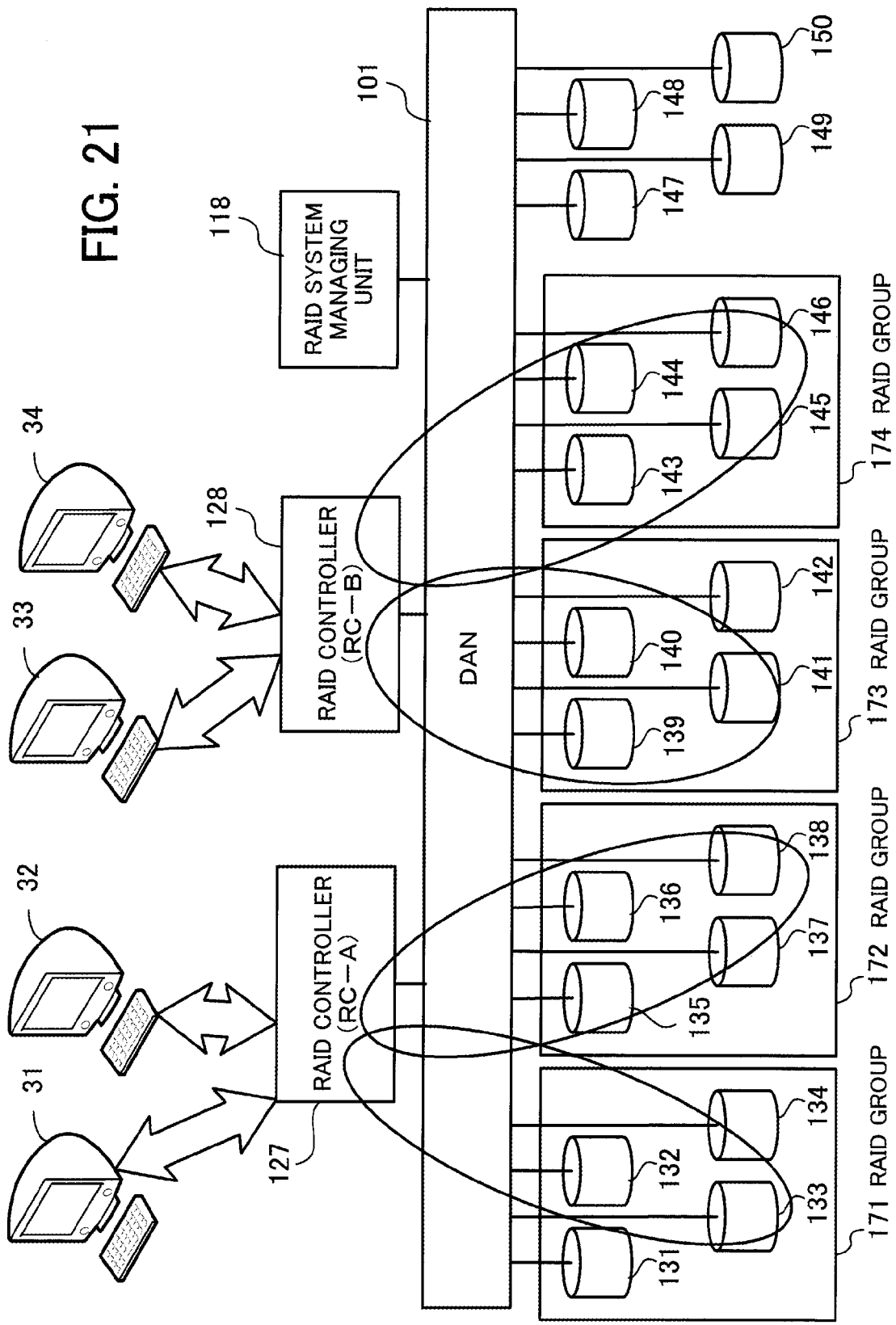
FIG. 21 illustrates a first state of a third exemplified state transition of a RAID system.
Figure 22:
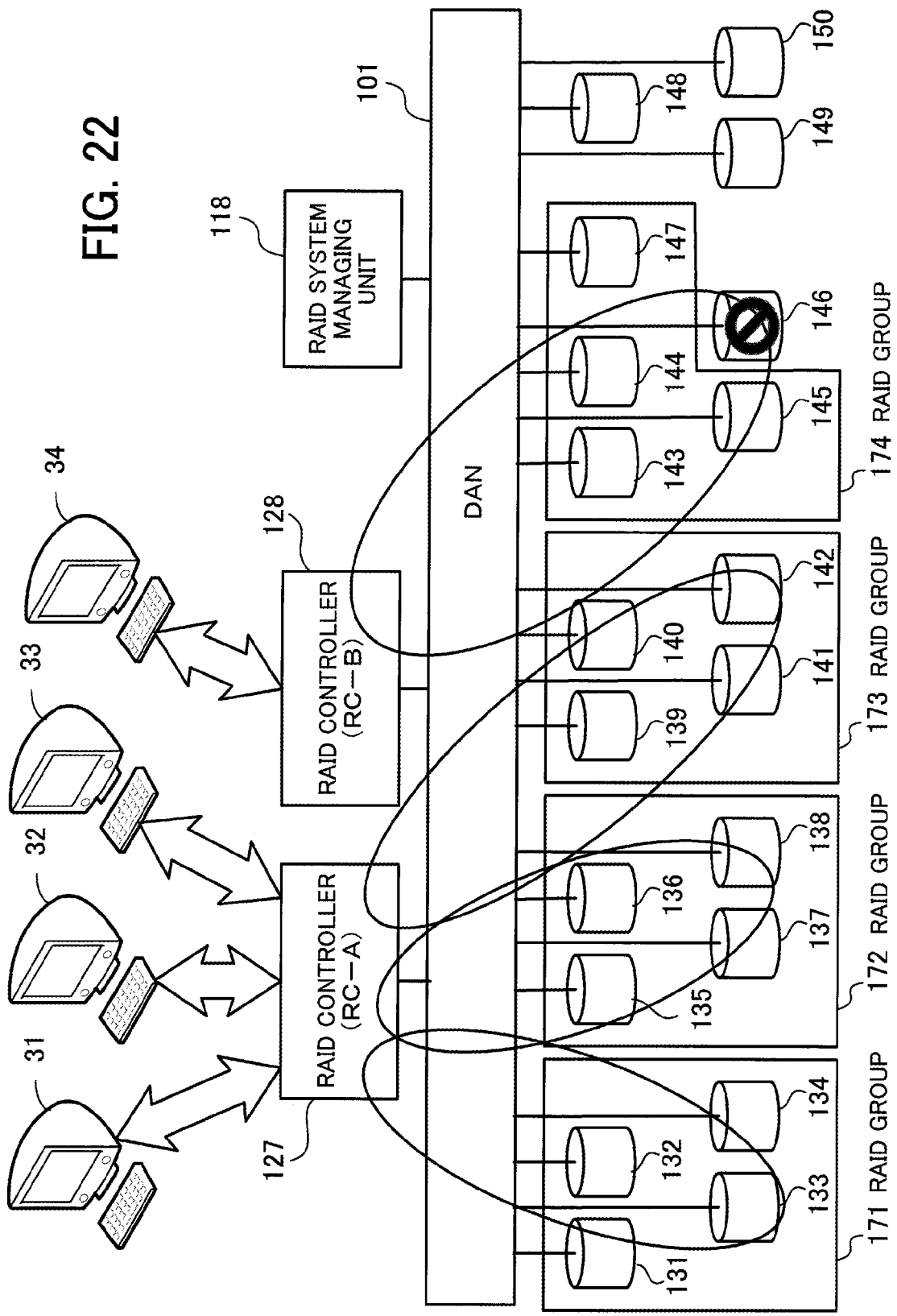
FIG. 22 illustrates a second state of the third exemplified state transition of the RAID system.
Figure 23:
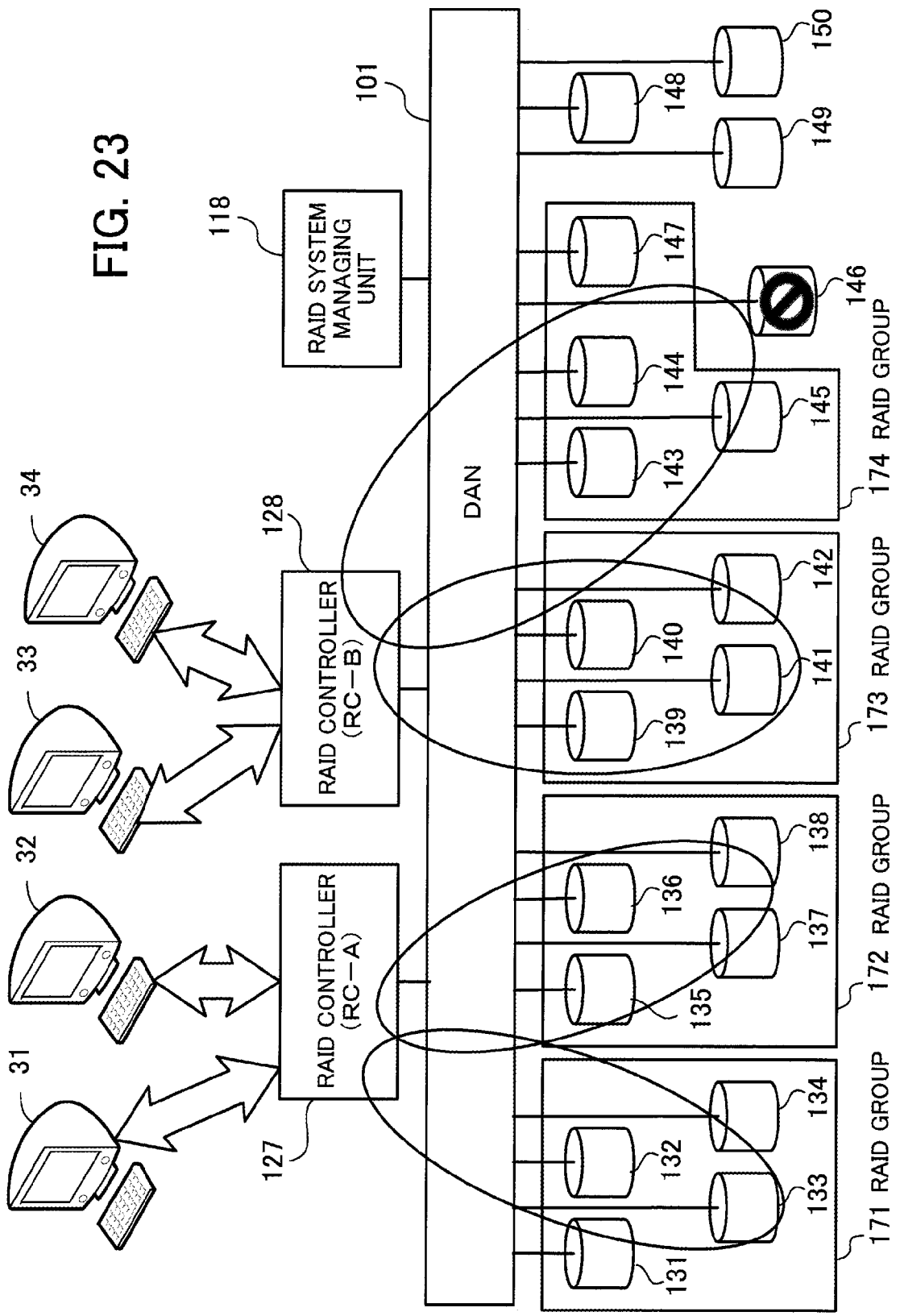
FIG. 23 illustrates a third state of the third exemplified state transition of the RAID system.

In the event a RAID group is degraded, a RAID controller with no RAID group connected thereto may not be present and the start-up of a new RAID controller may not be available. In this case, RAID groups other than the degraded RAID group are disconnected from a RAID controller with the degraded RAID group connected thereto, which enables execution of a rebuild process. This prevents the execution of the rebuild process from adversely affecting the RAID groups other than the degraded RAID group. With reference to FIGS. 21 through 23, the following describes state transition of the RAID system in the case of disconnecting RAID groups other than a degraded RAID group from a RAID controller.

FIG. 21 illustrates a first state of a third exemplified state transition of a RAID system. The first state of FIG. 21 represents a normal operation condition. In this state, the two RAID groups 171 and 172 are connected to the RAID controller 127 while the other two RAID groups 173 and 174 are connected to the RAID controller 128. The terminals 31 and 32 making use of the RAID groups 171 and 172, respectively, access data in the RAID groups 171 and 172 via the RAID controller 127. Similarly, the terminals 33 and 34 making use of the RAID groups 173 and 174, respectively, access data in the RAID groups 173 and 174 via the RAID controller 128.

FIG. 22 illustrates a second state of a third exemplified state transition of the RAID system. The second state of FIG. 22 represents a condition where the HDD 146 has failed. The failure of the HDD 146 causes the RAID group 174 including the HDD 146 to fall into a degraded state. The RAID group 173 is disconnected from the RAID controller 128 and, then, newly connected to the RAID controller 127. With this condition, the RAID controller 128 executes a rebuild process for the RAID group 174. Note that the terminal 33 using the RAID group 173 is able to access data in the RAID group 173 via the RAID controller 127.

FIG. 23 illustrates a third state of a third exemplified state transition of the RAID system. The third state of FIG. 23 represents a condition after the rebuild process is completed. After the completion of the rebuild process, the RAID group 173 is reconnected back to the RAID controller 128. With this, the original operation state before the failure of the HDD 146 is restored.

According to the example of FIGS. 21 through 23 as described above, a RAID group other than a degraded RAID group is disconnected from a RAID controller with the degraded RAID group connected thereto. With this, it is possible to prevent a rebuild process for the degraded RAID group from adversely affecting the normally operating RAID group even if a RAID controller with no RAID group connected thereto is not present. Note that the operations illustrated in FIGS. 21 through 23 are carried out under the control of the RAID system managing unit 118.

The following gives a detailed description regarding a control process of the RAID system managing unit 118 for switching a connection between disk groups and RAID controllers.

Figure 24:
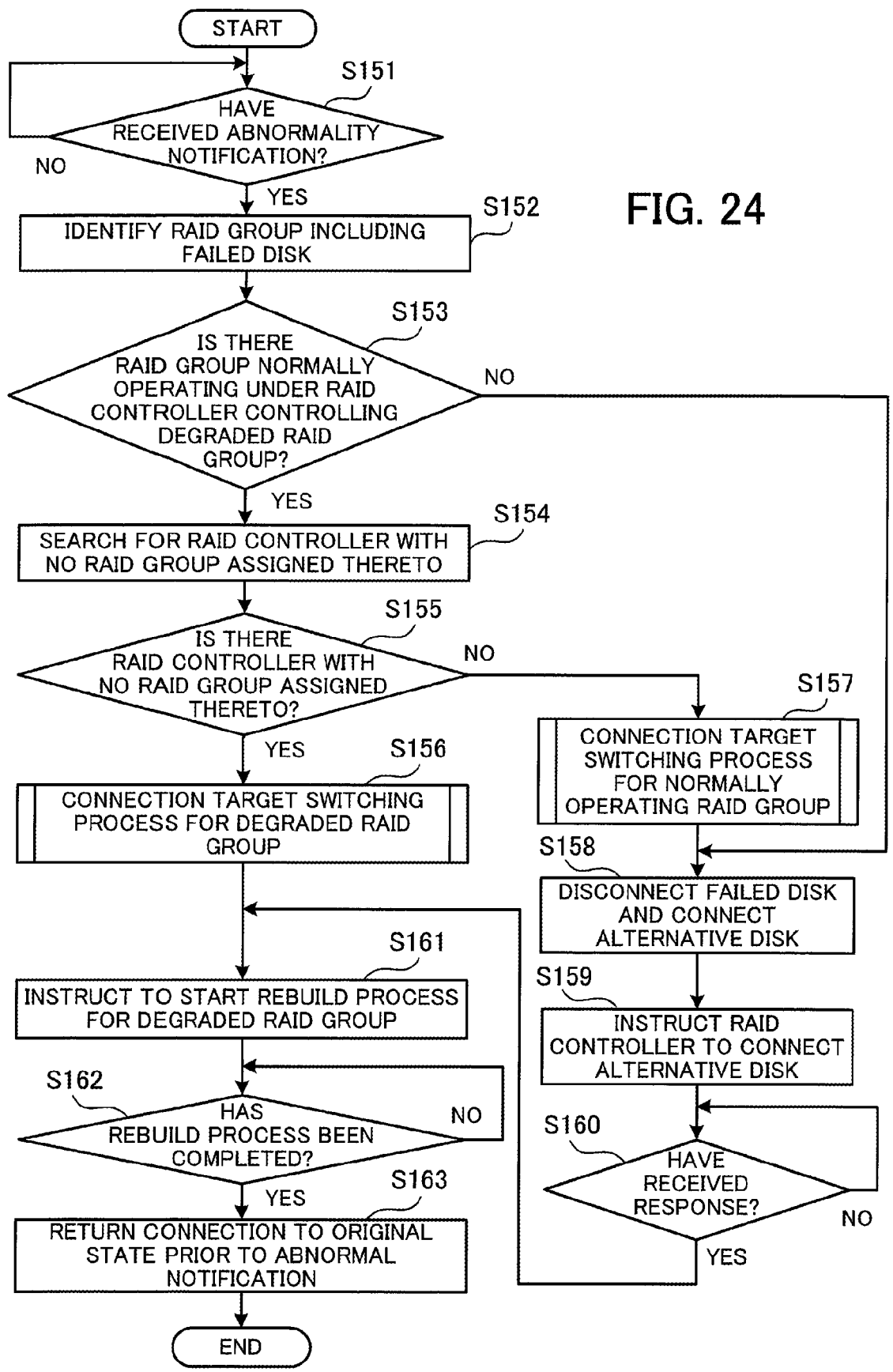
FIG. 24 is a flowchart illustrating an example of procedures for connection switching control between disk groups and RAID controllers.

FIG. 24 is a flowchart illustrating an example of procedures for connection switching control between disk groups and RAID controllers. The control procedures of FIG. 24 are described next according to the step numbers in the flowchart.

[Step S151] The RAID group managing unit 118d determines whether it has received an abnormality notification from a RAID controller. If the determination is affirmative, the RAID group managing unit 118d proceeds to step S152. If the determination is negative, the RAID group managing unit 118d repeats step S151.

[Step S152] The RAID group managing unit 118d identifies a RAID group to which a failed disk belongs (i.e., "degraded RAID group"). Specifically, the RAID group managing unit 118d extracts a DISK-ID of the failed HDD from the abnormality notification and, then, searches the RAID group management table 118h using the extracted DISK-ID as a search key. A RAID group identified by a RAID-ID corresponding to the search-key DISK-ID is determined as the degraded RAID group. Subsequently, the RAID group management unit 118d recognizes a CPU-ID set, within the connection-target CPU column, in a field corresponding to the RAID-ID, and determines that a RAID controller operating in a CPU unit having the CPU-ID controls the degraded RAID group.

[Step S153] Referring to the RAID group management table 118h, the RAID group unit 118d determines whether there is a RAID group normally operating under the control of the RAID controller (of the connection-target CPU) controlling the degraded RAID group. If the determination is affirmative, the RAID group managing unit 118d proceeds to step S154. If the determination is negative, the RAID group managing unit 118d proceeds to step S158.

[Step S154] The RAID group managing unit 118d searches for a RAID controller with no RAID group assigned thereto. Specifically, referring to the CPU management table 118f, the RAID group managing unit 118d selects a CPU unit with "unassigned" set in the status column and designates the selected CPU unit as a new connection target for the degraded RAID group.

Note that the RAID group managing unit 118d may communicate with the selected CPU unit to determine whether its RAID controller is in operation. If the RAID controller is not operating, the RAID group managing unit 118d may instruct the selected CPU unit to start the RAID controller.

[Step S155] The RAID group managing unit 118d determines whether a RAID controller with no RAID group assigned thereto has been detected. If the determination is affirmative, the RAID group managing unit 118d proceeds to step S156, in which the detected RAID controller is used as a new connection target for the degraded RAID group. If the determination is negative, the RAID group managing unit 118d proceeds to step S157.

[Step S156] The RAID group managing unit 118d carries out a process of switching a connection target of the degraded RAID group. This process is described later in detail (see FIG. 25). Subsequently, the RAID group managing unit 118d proceeds to step S161.

[Step S157] The RAID group managing unit 118d carries out a process of switching a connection target of a normally operating RAID group. This process is described later in detail (see FIG. 26).

[Step S158] The RAID group managing unit 118d instructs the controller disk managing unit 118c to disconnect the failed disk of the degraded RAID group from the RAID controller controlling the degraded RAID group, and also instructs the controller disk managing unit 118c to connect an alternative disk in place of the failed disk to the RAID controller. In response to the instructions, the controller disk managing unit 118c disconnects the failed disk and connects the alternative disk.

[Step S159] The RAID group managing unit 118d instructs the RAID controller with the degraded RAID group connected thereto to establish a connection to the alternative disk.

[Step S160] The RAID group managing unit 118d determines whether it has received a response indicating that the connection of the alternative disk has been completed. If the determination is affirmative, the RAID group managing unit 118d proceeds to step S161. If the determination is negative, the RAID group managing unit 118d repeats step S160 to wait for a response from the RAID controller with the degraded RAID group connected thereto.

[Step S161] The RAID group managing unit 118d instructs the RAID controller with the degraded RAID group connected thereto to start a rebuild process.

[Step S162] The RAID group managing unit 118d determines whether the rebuild process has been completed. Specifically, upon receiving a notification indicating completion of the rebuild process from the RAID controller in charge of the rebuild process, the RAID group managing unit 118d determines that the rebuild process has been completed. If the determination is affirmative, the RAID group managing unit 118d proceeds to step S163. If the determination is negative, the RAID group managing unit 118d repeats step S162 to wait for completion of the rebuild process.

[Step S163] The RAID group managing unit 118d returns connection among the RAID groups and the RAID controllers to their original state prior to the reception of the abnormality notification. For example, in the case where the connection target of the degraded RAID group has been switched from one RAID group controller to another, the RAID group managing unit 118d reconnects the rebuilt RAID group back to its original RAID controller. In the case where the connection target of a normally operating RAID group has been switched from one RAID group controller to another, the RAID group managing unit 118d reconnects the normally operating RAID group back to its original RAID controller, i.e., the RAID controller controlling the rebuilt RAID group. Further, in the case where a new RAID controller has been started on the selected CPU unit (in step S154), the RAID group managing unit 118d stops the operation of the RAID controller.

Figure 25:
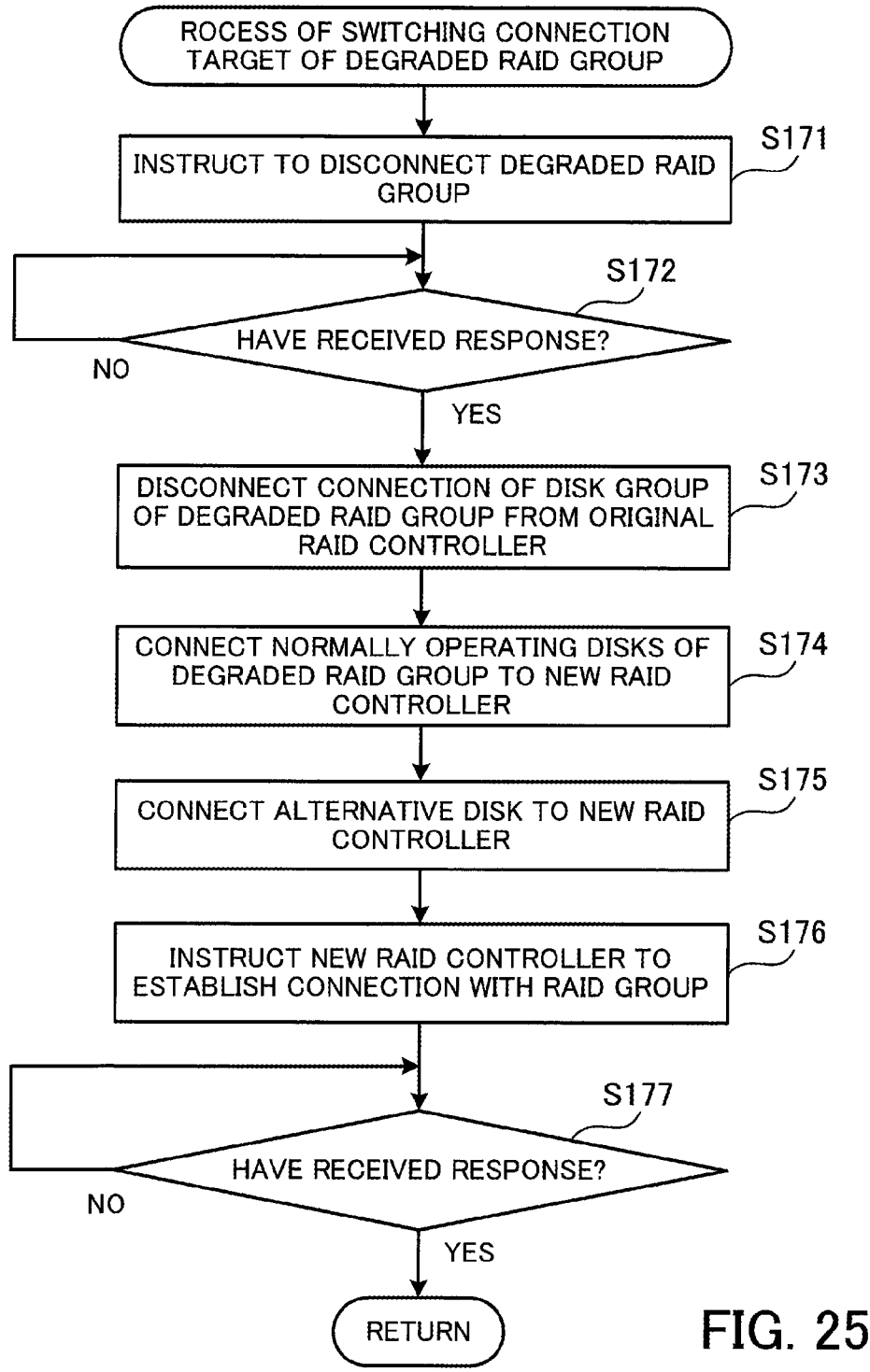
FIG. 25 is a flowchart illustrating an example of procedures for switching a connection target of a degraded RAID group.

Next, the process of switching a connection target of the degraded RAID group is described in detail. FIG. 25 is a flowchart illustrating an example of procedures for switching a connection target of a degraded RAID group. Note that the process of FIG. 25 corresponds to step S156 of FIG. 24. The process procedures of FIG. 25 are described next according to the step numbers in the flowchart.

[Step S171] The RAID group managing unit 118d transmits an instruction to the RAID controller controlling the degraded RAID group to disconnect the degraded RAID group. The disconnection instruction includes, for example, a RAID-ID of the degraded RAID group.

[Step S172] The RAID group managing unit 118d determines whether it has received a response to the disconnection instruction, indicating that the disconnection has been completed. If the determination is affirmative, the RAID group managing unit 118d proceeds to step S173. If the determination is negative, the RAID group managing unit 118d repeats step S172.

[Step S173] Upon receiving the response indicating completion of the disconnection, the RAID group managing unit 118d instructs the controller disk managing unit 118c to cut off disks (i.e., a disk group) belonging to the degraded RAID group from the RAID controller. In response to the instruction, the controller disk managing unit 118c controls the DAN 101 to disconnect the connection of the disks of the degraded RAID group from the RAID controller controlling the degraded RAID group.

[Step S174] The RAID group managing unit 118d instructs the controller disk managing unit 118c to connect normally operating disks (disks other than the failed disk) of the degraded RAID group to a new connection-target RAID controller. In response to the connection instruction, the controller disk managing unit 118c controls the DAN 101 to connect the normally operating disks to the RAID controller designated as a new connection target in step S155.

[Step S175] The RAID group managing unit 118d instructs the controller disk managing unit 118c to connect an alternative disk of the failed disk and the new connection-target RAID controller. Specifically, referring to the disk management table 118g, the RAID group managing unit 118d selects a HDD with "unassigned" set in the status column and designates the selected HDD as an alternative disk. Then, the RAID group managing unit 118d instructs the controller disk managing unit 118c to connect the alternative disk to the new connection-target RAID controller now controlling the degraded group. In response, the controller disk managing unit 118c controls the DAN 101 to connect the alternative disk according to the instruction.

[Step S176] The RAID group managing unit 118d instructs the new RAID controller, to which HDDs belonging to the degraded RAID group are now connected, to establish a connection with the degraded RAID group (i.e., establish a condition that enables communication).

[Step S177] The RAID group managing unit 118d determines whether it has received a response to the connection instruction. If the determination is affirmative, the RAID group managing unit 118d ends the process of switching the connection target of the degraded RAID group. If the determination is negative, the RAID group managing unit 118d repeats step S177 to wait for a response.

Figure 26:
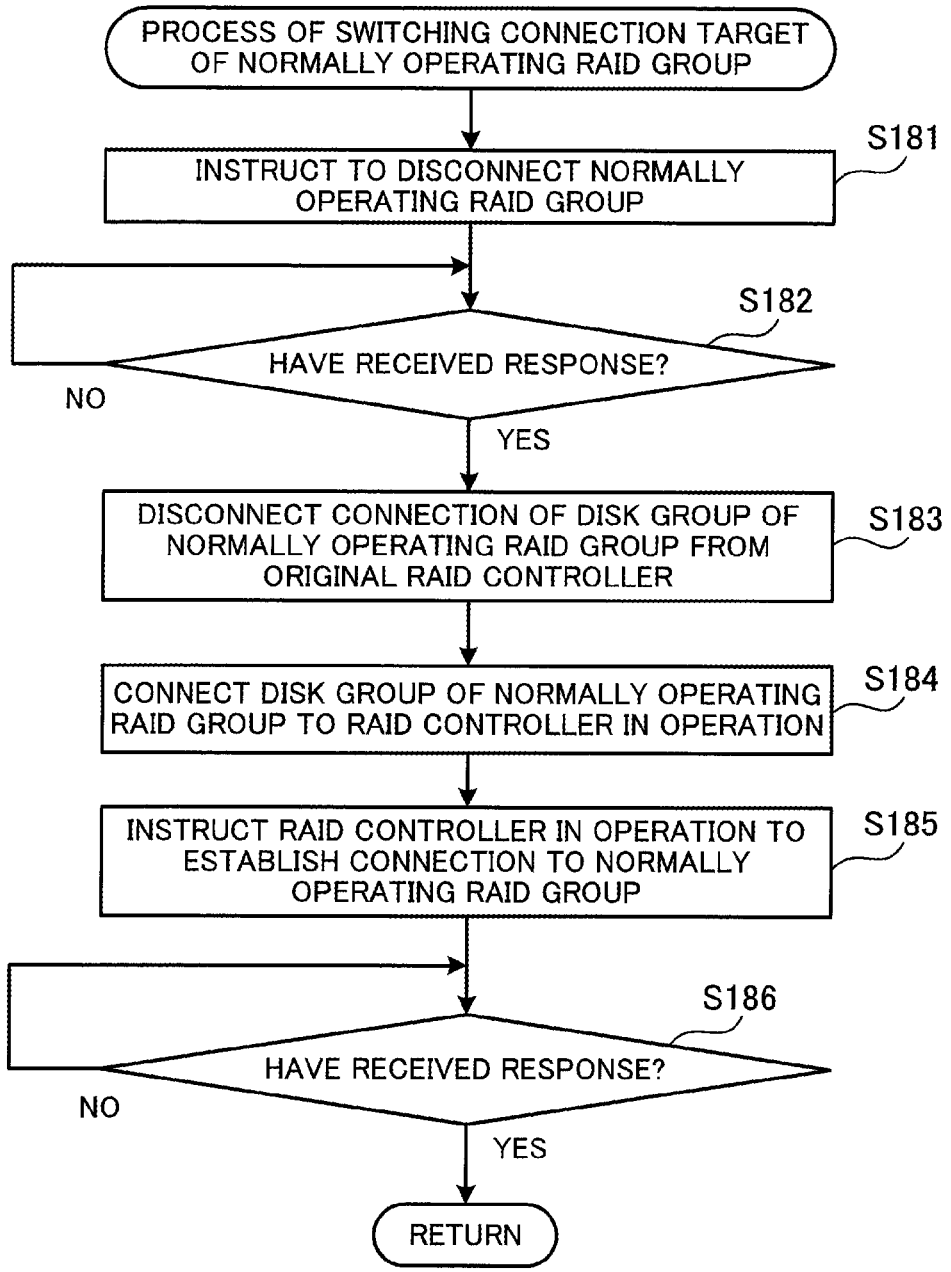
FIG. 26 is a flowchart illustrating an example of procedures for switching a connection target of a normally operating RAID group.

Next, the process of switching a connection target of a normally operating RAID group is described in detail. FIG. 26 is a flowchart illustrating an example of procedures for switching a connection target of a normally operating RAID group. Note that the process of FIG. 26 corresponds to step S157 of FIG. 24. The process procedures of FIG. 26 are described next according to the step numbers in the flowchart.

[Step S181] The RAID group managing unit 118d transmits an instruction to the RAID controller controlling the degraded RAID group to disconnect a normally operating RAID group connected to the RAID controller (hereinafter, simply referred to as the "normally operating RAID group").

[Step S182] The RAID group managing unit 118d determines whether it has received a response to the disconnection instruction, indicating that the disconnection has been completed. If the determination is affirmative, the RAID group managing unit 118d proceeds to step S183. If the determination is negative, the RAID group managing unit 118d repeats step S182.

[Step S183] Upon receiving the response indicating completion of the disconnection, the RAID group managing unit 118d instructs the controller disk managing unit 118c to cut off disks (i.e., a disk group) belonging to the normally operating RAID group from the RAID controller. In response to the instruction, the controller disk managing unit 118c controls the DAN 101 to disconnect the connection of the disks of the normally operating RAID group from the RAID controller.

[Step S184] The RAID group managing unit 118d instructs the controller disk managing unit 118c to connect the disks of the normally operating RAID group to a RAID controller already in operation. The RAID controller is one of RAID controllers already in operation but not the RAID controller with the degraded RAID group connected thereto. In response to the connection instruction, the controller disk managing unit 118c controls the DAN 101 to connect the disk group to the RAID controller in operation.

[Step S185] The RAID group managing unit 118d instructs the RAID controller, to which HDDs belonging to the normally operating RAID group are now connected, to establish a connection with the normally operating RAID group (i.e., establish a condition that enables communication).

[Step S186] The RAID group managing unit 118d determines whether it has received a response to the connection instruction. If the determination is affirmative, the RAID group managing unit 118d ends the process of switching the connection target of the normally operating RAID group. If the determination is negative, the RAID group managing unit 118d repeats step S186 to wait for a response.

According to the above-described processes, a rebuild process is executed on a RAID group including a failed disk by a RAID controller different from RAID controllers controlling other RAID groups in operation. This prevents the execution of the rebuild process from adversely affecting the RAID groups other than the rebuild process-target RAID group.

As described above, according to the second embodiment, if a HDD belonging to a RAID group fails, a RAID controller with a degraded RAID group alone connected thereto executes a rebuild process. This prevents the execution of the rebuild process from adversely affecting normally operating RAID groups.

(c) Other Embodiment

According to the second embodiment, the CPU of the managing unit runs a program to thereby implement the functions of the RAID system managing unit, however, a part of processes descried in the program may be replaced with an electronic circuit. For example, at least part of the above-described processing functions may be implemented by an electronic circuit, such as a digital signal processor (DSP), an application specific integrated circuit (ASIC), and a programmable logic device (PLD).

According to one aspect, it is possible to prevent a process of restoring data redundancy from adversely affecting other processes.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A storage management system comprising:
    a plurality of storage apparatuses, at least part of which are individually incorporated into one of storage groups in such a manner that each of the storage groups is made up of one or more of the storage apparatuses;
    a plurality of control apparatuses each configured to, when assigned one or more of the storage groups, control data storage by storing data designating each of the assigned storage groups redundantly in the storage apparatuses of the assigned storage group; and
    an information processing apparatus configured to,
        when a storage group with data redundancy being lost is detected, make a change in control apparatus assignment for the storage groups in such a manner that a storage group different from the detected storage group is not assigned to a control apparatus with the detected storage group assigned thereto and
        after the change of the control apparatus assignment, cause the control apparatus with the detected storage group assigned thereto to execute a process of restoring the data redundancy of the detected storage group.

2. The storage management system according to claim 1, wherein
    in response to the detection of the storage group with data redundancy being lost, the information processing apparatus identifies, from among the control apparatuses, a control apparatus with no storage group assigned thereto, and changes an assigned target of the detected storage group to the identified control apparatus.

3. The storage management system according to claim 1, wherein
    in response to the detection of the storage group with data redundancy being lost, the information processing apparatus starts a control apparatus not in operation selected from among the control apparatuses, and changes an assigned target of the detected storage group to the started control apparatus.

4. The storage management system according to claim 3, wherein
    upon completion of the restoring process for the detected storage group by the started control apparatus, the information processing apparatus changes the assigned target of the detected storage group to a control apparatus other than the started control apparatus, and stops operation of the started control apparatus.

5. The storage management system according to claim 1, wherein
    in response to the detection of the storage group with data redundancy being lost, the information processing apparatus changes an assigned target of a storage group different from the detected storage group but currently assigned to the control apparatus with the detected storage group assigned thereto to a control apparatus other than the control apparatus with the detected storage group assigned thereto.

6. The storage management system according to claim 5, wherein
    upon completion of the restoring process for the detected storage group, the information processing apparatus changes the assigned target of the different storage group back to the control apparatus with the detected storage group assigned thereto.

7. A storage management method, comprising:
    making, by a processor, a change in control apparatus assignment for a plurality of storage groups when a storage group with data redundancy being lost is detected from among the storage groups, each of which is made up of one or more storage apparatuses and in each of which data is stored redundantly by a control apparatus assigned to the storage group, the change being made in such a manner that a storage group different from the detected storage group is not assigned to a control apparatus with the detected storage group assigned thereto; and
    causing, by the processor, the control apparatus with the detected storage group assigned thereto to execute a process of restoring the data redundancy of the detected storage group after the change of the control apparatus assignment.

8. A computer-readable storage medium storing a computer program, the computer program causing an information processing apparatus to perform a procedure comprising:
    making a change in control apparatus assignment for a plurality of storage groups when a storage group with data redundancy being lost is detected from among the storage groups, each of which is made up of one or more storage apparatuses and in each of which data is stored redundantly by a control apparatus assigned to the storage group, the change being made in such a manner that a storage group different from the detected storage group is not assigned to a control apparatus with the detected storage group assigned thereto; and
    causing, after the change of the control apparatus assignment, the control apparatus with the detected storage group assigned thereto to execute a process of restoring the data redundancy of the detected storage group.

* * * * *